US005471741A

United States Patent [19]

Heisner et al.

[11] Patent Number: 5,471,741

[45] Date of Patent: Dec. 5, 1995

[54] WIRE HARNESS TERMINATION APPARATUS

[75] Inventors: Douglas L. Heisner, Downers Grove; Peter Ingwersen, Gilberts; Lawrence M. Kurek, Elgin; Thomas P. Pellegrino, Lisle, all of Ill.

[73] Assignee: Molex Incorporated, Lisle, Ill.

[21] Appl. No.: 323,556

[22] Filed: Oct. 17, 1994

[51] Int. Cl.[6] ............................ H01R 43/00; B23P 23/00

[52] U.S. Cl. ............................ 29/857; 29/564.1; 29/749; 29/755; 29/861

[58] Field of Search ............................ 29/861, 755, 749, 29/33 M, 564.1, 857

[56] References Cited

U.S. PATENT DOCUMENTS

| | | | |
|---|---|---|---|
| 4,087,908 | 5/1978 | Fusco et al. . | |
| 4,441,251 | 4/1984 | Grubb | 29/861 |
| 4,492,023 | 1/1985 | Schneider et al. | 29/861 |
| 4,675,995 | 6/1987 | Anderson | 29/861 |
| 4,734,965 | 4/1988 | Schaefer | 29/755 X |
| 4,819,329 | 4/1989 | Haley et al. | 29/861 X |
| 4,903,403 | 2/1990 | Brown et al. | 29/861 |
| 4,979,292 | 12/1990 | Fukuda et al. | 29/861 X |
| 5,033,188 | 7/1991 | Polliard et al. . | |
| 5,083,369 | 1/1992 | Cerda | 29/861 X |
| 5,309,633 | 5/1994 | Ricard | 29/861 |
| 5,327,644 | 7/1994 | Tanaka et al. | 29/861 |
| 5,333,376 | 8/1994 | Lawruk | 29/861 |

FOREIGN PATENT DOCUMENTS

| | | | |
|---|---|---|---|
| 427500 | 5/1991 | European Pat. Off. | 29/755 |
| 87-1245 | 2/1987 | WIPO | 29/755 |

*Primary Examiner*—Carl J. Arbes
*Attorney, Agent, or Firm*—Charles S. Cohen

[57] ABSTRACT

A wire harness-making machine for producing wire harnesses of the type in which multiple wires extend between opposing first and second electrical connector elements. The machine includes a feeding assembly which separates successive first wire connectors and a transfer nest which shuttles the first array of connectors from a first connector advancement track to a first termination station. Multiple wires are fed to the first termination station where first free ends thereof are terminated to the first connector. Once terminated to the multiple wires, the first connector is shuttled back to the first connector advancement track. The first connector is then advanced along a feedpath and a set of second free ends of the wires are transferred to a second termination station while maintaining the order of the wires. A second connector is advanced from a second feed track into the second termination station where it is terminated to the second wire free ends at the same time a succeeding first set of wire free ends is terminated at the first termination station.

19 Claims, 16 Drawing Sheets

WIRE HARNESS TERMINATION APPARATUS

BACKGROUND OF THE INVENTION

The present invention relates generally to the assembly of wire harnesses, and more particularly, to an improved method and an apparatus for assembling wire harnesses in which opposite ends of sets of adjacent sets of electrical wires are terminated to connector elements.

Wire harnesses and cable assemblies are used in numerous consumer electronic products, such as televisions and computers. Wire harnesses are also used in many other applications, such as automobiles and industrial controls. Wire harnesses may take a variety of forms, ranging from a single wire interconnecting two connector elements to a "multiple" wire harness in which multiple wires extend between opposing connectors or sets of connector housings.

Although wire harnesses may be assembled manually, automated production of wire harnesses is preferred from a cost and efficiency standpoint. It is desirable to manufacture multiple wire harnesses by terminating multiple harnesses as a whole, rather than terminating each harness individually. Wire harnesses are typically assembled in automated production by attaching, or terminating connectors to opposing free ends of wires. When terminating multiple harnesses, termination of the opposing wire ends is sometimes performed sequentially at two different, but opposing, locations. This may involve assembling the wire harness components along a single work path, such as advancing wires to a first termination location, terminating first connector elements to a first set of free ends of the harness wires at the first termination location to form a partial wire harness assembly, advancing the partial wire harness assemblies along the workpath to a second termination location, then terminating second connector elements to second free wire ends which lie opposite the first free wire ends. This process is sequentially repeated for each wire harness. In order to accelerate production, it is desirable that while the second connector elements are terminated to the second free wire ends, the first connector elements of a subsequent wire harness are terminated to their associated first wire free ends.

Conventional wire harness assembly processes, as represented by the prior art, place the two termination station along a workpath which is the same as the wire feedpath. This linear production path arrangement poses at least one problem in termination of multiple wire harnesses, in that the harness wires must be transferred along the workpath from the first termination location to the second termination location, which may lead to disorder of the second ends of the wires as they are transferred to the second termination location for termination.

Methods and apparatus for the assembly of wire harnesses, and particularly multiple wire harnesses, are known in the prior art. Typically, one or more connector housings are forwarded from a supply of connector housings into position for termination to one end of the harness wires, and the connector housings are subsequently terminated to the wire ends. The wires are then advanced to define a desired length for the wire harness, and a second set of connector housings are then terminated thereto. The termination of the first and second connector housings is commonly performed in serial order, such as described in U.S. Pat. No. 4,087,908, issued May 9, 1978 to the assignee of the present application. Wires are advanced along a path into engagement with a first connector housing, the first connector housing is terminated to the first wire end, the wire is further advanced and cut to define a second end, which is then terminated to a second connector housing.

U.S. Pat. No. 5,033,188, issued Jul. 23, 1991, describes a wire harness assembly process in which wires are fed into a cut and strip assembly and then terminated to a first connector. The wires are further advanced down a processing line where a second connector housing is applied to the wire loose ends and terminated thereto. Although this method and the previously described apparatus are sufficient to terminate connector to opposing wire ends and form wire harnesses, the serial order of the two termination steps limits the speed at which the harnesses may be fabricated.

It is therefore desirable to maintain the order of multiple harness wires as they are transferred between termination locations in a harness-making machine such that the wires are terminated to the second connector elements in their desired order. It also becomes desirable to provide a transfer mechanism utilizable in the termination of multiple wires which protects the unterminated wire ends as they are transferred from the first termination location to the second termination location.

Accordingly, the present invention is directed to an apparatus and method in which opposing first and second ends of adjacent wire harness sets are terminated in the same step, which increases the speed of fabrication of the harnesses. It is therefore an object of the present invention to provide a new and improved wire fabrication apparatus which overcomes the disadvantages of the prior art.

It is another object of the present invention to provide a multiple wire harness assembly apparatus having a feed assembly suitable for use in conjunction with a wire harness assembly which is adapted to feed and separate multiple connectors from multiple supplies of interconnected connectors, an indexing assembly which positions a row of first connectors in position for termination, a wire feed assembly for advancing multiple wires into contact with the array of first connectors, a first termination assembly which terminates the array of first connectors to a first set of multiple wire loose ends, a second termination assembly which terminates an array of second connectors to a set of second wire ends, and a transfer assembly which transfers the set of multiple wires between the first and second termination assemblies, while maintaining the order of the wires.

It is another object of the present invention to provide a method for assembling multiple wire harnesses in which distinct arrays of first and second connectors are terminated to opposite ends of multiple harness wires, the termination occurring along a common line of action, whereby while one set of wires are being terminated to an array of first connectors, an adjacent set of wires which have previously been terminated to an array of first connector housings is terminated to a second array of connectors, the terminated wire harnesses further moving along a conveyance path which is offset from the path of wire feeding.

It is a further object of the present invention to provide a wire harness fabrication apparatus having two termination stations arranged in side-by-side order, each termination station having a connector feed supply station associated therewith, the connector feed supply stations further being spaced apart from each other on opposite sides of the apparatus, wherein a first array of connectors is supplied along a first harness track into registration with a reciprocating nest assembly which shuttles the first array of connector housings into registration within the first termination station, the first termination station including means for cutting first ends of a series of multiple wires fed therethrough, the nest moving back to the connector supply track after the first array of connectors are terminated, the second termination station being disposed adjacent to the first termination station, the apparatus further including a transfer assembly which clamps loose ends of the wires.

Yet still another object of the present invention is to provide a wire harness assembly apparatus in which successive arrays of first connector are fed to a first termination station to form successive partially terminated wire-connector assemblies which are then transferred to a second termination station, the second termination station terminating a second array of connectors to second ends of harness wires while simultaneously terminating a successive first array of connectors to a successive set of harness wires, the first and second arrays of connectors being advanced along feed paths which are transverse to a wire feed path.

SUMMARY OF THE INVENTION

The present invention accomplishes these objects and provides a new and improved a wire harness-making machine and method for making wire harnesses. The wire harness-making machine includes a pair of spaced-apart wire harness connector advancement tracks which lead past a pair of termination assemblies. More particularly, a first feed assembly comprises a first connector element feed mechanism, a first connector element severing means, and a first connector loading mechanism, the loading mechanism being aligned with a first connector element transfer means. The feed assembly additionally includes an alignment and verification means which cooperates with the severing means and connector element advancement means to verifies the presence or absence of all the connectors in the row and indicate the absence of a properly positioned connector element by generating an alarm.

In accordance with the preferred embodiment, a severing means is provided in,conjunction with the alignment means and operates to separate lead rows of connector elements from the advancing supply of connector elements by passing a severing blade through bridging portions which interconnect adjoining rows of connector elements. The severing blade remains in place after its severing stroke and defines a guide surface along which the row of separated connector elements are advanced into position through a feed channel en route to further processing.

The present invention further includes means for shuttling successively separated rows of first connector elements from the first connector advancement track to a first termination station where wires are fed into the connector elements and terminated thereto to form a partial wire harness assembly. In the preferred embodiment, this shuttling means includes a reciprocating connector nest which moves back and forth between the first connector advancement track and the first termination station. The connector nest holds a row of first connector elements in place during transfer to the termination station and further during termination at the first station. It then returns back to the first connector advancement track to define the length of the final wire harness. These wires are subsequently cut to form a set of second set of wire ends.

In accordance with the preferred embodiment, a moveable clamping head is provided which clamps the second set of wire ends within the clamping head. The clamping head is mounted on the frame of the harness-making machine and is adapted for reciprocating movement along a wire transfer path extending between the two termination stations. The clamping head includes a pair of opposing wire engagement members which reciprocate as a unit along the wire transfer path and cooperate to define a passage through which the harness wires pass as they are drawn away from their first termination location prior to the cutting thereof. This passage narrows upon contact by the opposing engagement surfaces of the clamping head with the harness wires. The clamping head further has means defining an extension of this narrow passage which maintains the wires in their original order and protects them during the transfer of the wires to the second work station.

In further accordance with the preferred embodiment, the clamping head includes a collapsible wire locator assembly which extends from the clamping head. This assembly includes a locator bar and a support bar, the locator bar having a plurality of grooves formed which are aligned with the wires held by the transfer assembly clamping head and which further correspond to a plurality of wire-receiving openings formed in an array of second connector elements. The support bar provides a support surface for the wires held in the transfer assembly and defines the bottom surfaces of the locator bar grooves. Both the locator and support bars are spring-loaded and extend outwardly over a second set of wire ends held by the clamping head. The wires extend within the locator bar slots and supported in the slots by the support bar to thereby protect the second wire free ends during their transfer between the first and second work locations of the harness-making machine and to guide the wire ends into engagement with connector elements for termination.

A second connector feed assembly is provided by the present invention which separates successive rows of second connector elements from interconnected supply belts and advances the successive separated rows into a second connector element transfer assembly. The second transfer assembly reciprocates back and forth between the second feed assembly and the second termination station. The second termination station is disposed adjacent the first termination station and terminates the second set of wire ends held in the clamping head to a set of second connector elements held by the second connector transfer nest. The termination of the first and second connector elements is accomplished simultaneously because the second set of wire ends are inserted into the second connector elements at the same time a successive first set of wire ends are inserted into and successive first connector elements, the first and second connector elements being terminated at the same time.

The present invention also includes a means for shifting the order of selected wires within the harness by providing a pedestal which supports a plurality of elongated wire guides, the wire guides defining elongated wire-receiving channels which extend the length of the wire guides. Some of the wire guides are fixed is position upon the pedestal, while others are movably mounted thereon The fixed wire guides define straight wire paths between opposing entrance and exit portions of the pedestal, while the moveable wire guides define angled wire paths between same.

These and other objects, features and advantages of the present invention will be apparent through a reading of the following detailed description, taken in conjunction with accompanying drawings, wherein like reference numerals refer to like parts.

BRIEF DESCRIPTION OF THE DRAWINGS

In the course of this description, reference will be frequently made to the attached drawings in which:

FIGS. 7A–I are plan views of the wire harness-making machine illustrating the sequence of operation for termination of a wire harness and in which FIG. 7A illustrates the step of loading an array of first connector elements into the first connector element transfer nest;

FIG. 7B is a view illustrating the step of shuttling the array of first connectors from the first connector element advancement track to the first termination station;

FIG. 7C is a view illustrating the shuttled array of first connector elements in place with the first termination station where a series of harness wires are advanced into a connector element array and terminated to the array;

FIG. 7D is a view illustrating the step of shuttling the array of terminated first connector elements away from the first termination station back to the first connector element advancement track to define the length of the wires in the wire harness;

FIG. 7E is a view illustrating the step of clamping the extended harness wires within the transfer assembly and cutting the wires to define a second set of wire free ends;

FIG. 7F is a view illustrating the step of shuttling a successive array of first connector elements to the first work station while transferring the clamped harness wires to a second termination station while transporting an array of second connector elements to the second termination station;

FIG. 7G is a view illustrating the step of terminating the second set of wire ends to the array of second connector elements at the second termination station while terminating a successive array of first connector elements to a successive set of harness wire first ends at the first termination station;

FIG. 7H is a view illustrating the step of moving the terminated subsequent array of first connector elements back to the first connector element advancement track in order to pay out a second predetermined length for the subsequent set of wires;

FIG. 7I is a view illustrating the steps of transferring the subsequent set of harness wires to the second termination station while moving another array of first connector elements to the first termination station;

DETAILED DESCRIPTION OF THE PREFERRED EMBODIMENT

The present invention is directed to an apparatus for the automated production of wire harnesses in which first and second sets of connectors are terminated simultaneously to successive sets of wire harnesses.

The detailed description of the present invention to follow will first describe the structure of wire harnesses made on the present invention, then describe the operation of the harness-making machine, and describe the individual processing stations of the wire harness-making machine. Although the present invention may be used to assemble a variety of different style and size wire harnesses using a variety of connector elements, the following detailed description will utilize connector elements as illustrated in FIGS. 2–5. The use of these particular connector elements is for example only, and it will be understood that the present invention is not be limited to operation and use with the specific connectors illustrated herein. Other connectors may be suitably used therewith and equivalent results and benefits obtained.

Wire Harnesses Produced by the Harness-Making Machine

Figure 6:
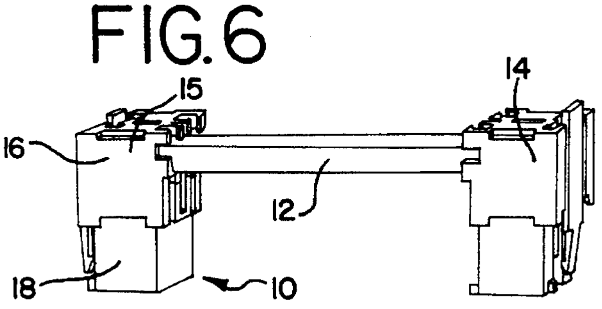
FIG. 6 is an elevational view of a wire harness produced by the wire harness-making machine and using the connector elements of FIG. 2.

FIG. 6 illustrates a wire harness 10 produced on a wire harness-making machine 100 (FIG. 1) constructed in accordance with the principles of the present invention. The wire harnesses 10 are generally of the type which have a plurality of spaced-apart wires 12 which extend between two opposing electrical connector elements 14. The connector elements 14 typically may be of a two-component style construction, wherein each connector element 14 is formed from two interengaging connector components 16, 18, which are interlocked together. These components include a connector base component 16 and a head component 18.

Figure 3:
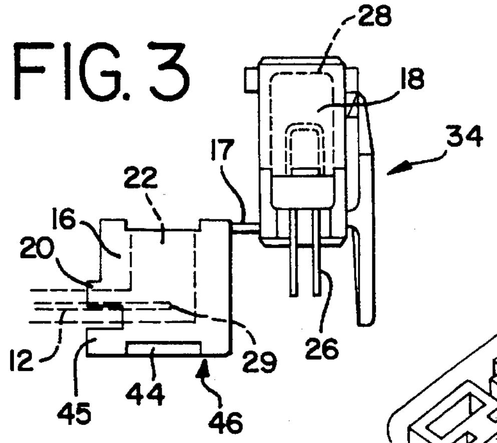
FIG. 3 is an elevational view of a single connector assembly which is combined with other similar connector assemblies to make up the supply belt illustrated in FIG. 2.

The base component 16 has a plurality of wire-receiving openings 20 therein which lead to an internal cavity 22 and which receive loose ends 24 of harness wires 14 therein for termination (FIG. 3). The head, or terminal component 18, rests upon the base component 16 and partially extends into the internal cavity 22. The head component 18 includes a plurality of electrical contacts 26 disposed within an internal cavity 28 and which are aligned with the wire-receiving openings 20 of the base component 16. When the two connector components 16, 18 are pressed together with suitable force, the contacts 26 pierce the outer insulation layer 30 of the wires 12 to electrically engage the inner conductor portions 32 of the harness wires 12 disposed within the wire-receiving openings 20. The electrical contacts 26 not only establish a reliable electrical connection with the harness wires 12, but they also hold the wires in place within the assembled connector element 14.

Figure 2:
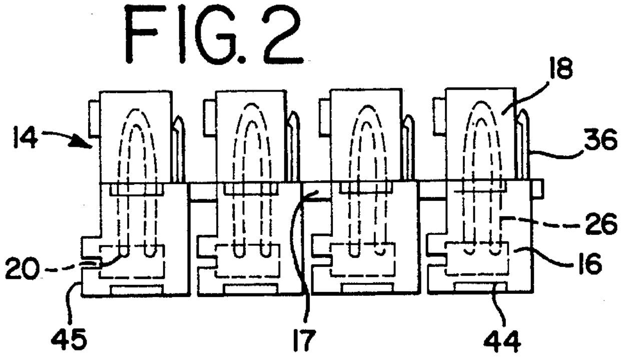
FIG. 2 is an elevational view of a portion of a supply belt of interconnected electrical connector elements utilized in the operation of the wire harness-making machine of FIG. 1.

The two connector housing components 16, 18 are preferably formed by injection molding them as individual two-piece assemblies 34; each assembly containing a head component 18 and a base component 16 offset from each other, but interconnected by integral bridging pieces 17 (FIG. 3). The assemblies 34 are assembled automatically, by a suitable mechanism, into a continuous supply chain, or bandolier 36, of connector housings (FIG.2). The interconnecting connector pieces 17 allow the supply chain 36 to flex and permits such supply chain to be easily fed into the harness-making machine 100.

Preferably, for reasons which are evident below, the connector element supply chains 36 are arranged in side-by-side order wherein each connector element 14 is aligned with an adjacent connector element in an adjoining supply chain. In this manner, multiple connector element supply chains may be arranged in side-by-side order and fed into the harness-making machine 100 as a mass 38 (FIG. 4) defining a series of successive rows of connector elements 14 which extend generally transverse to the axes L of the constituent supply chains 36.

Overall Operation of the Wire Harness-Making Machine

Figure 1:
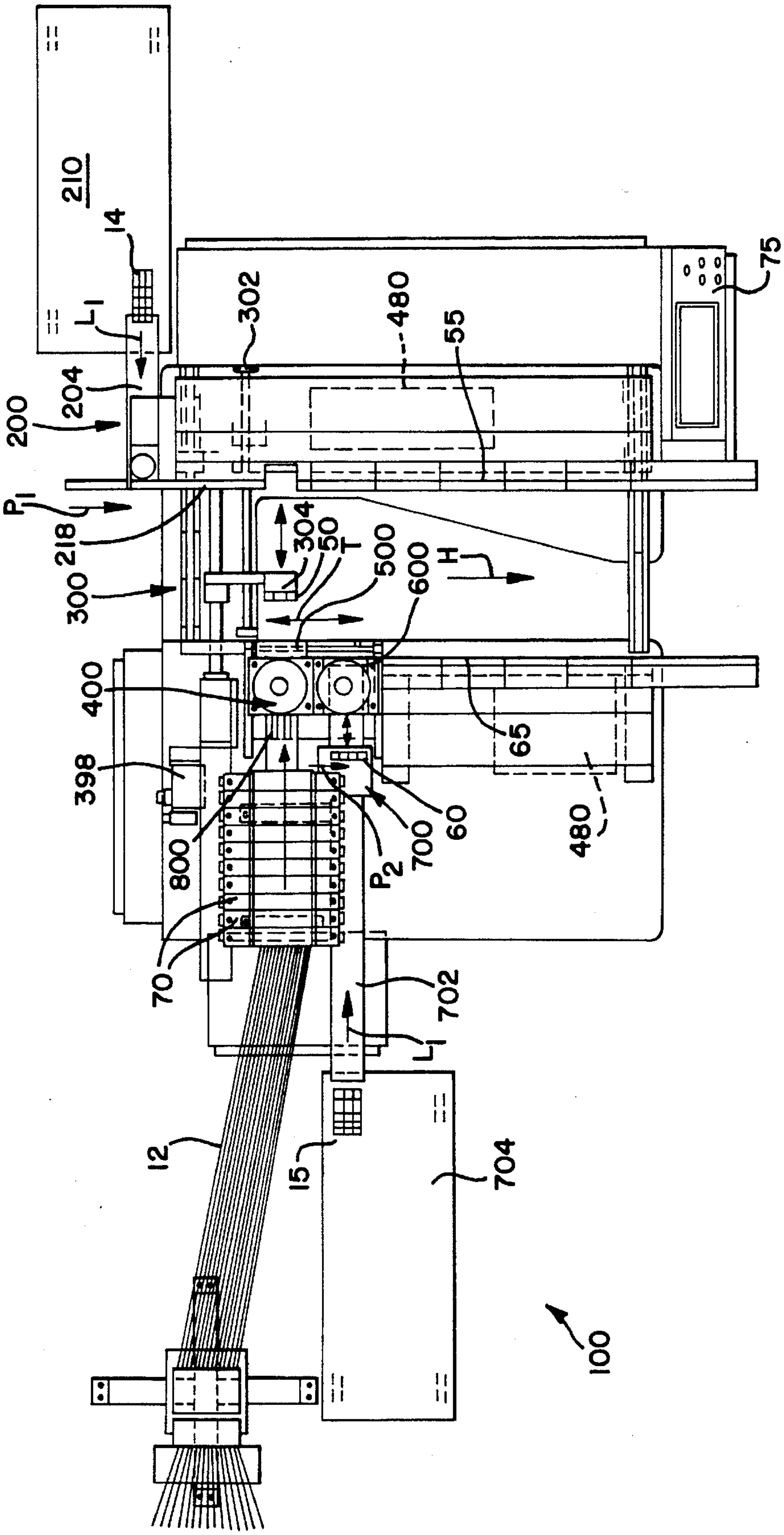
FIG. 1. is a plan view of a wire harness making-machine constructed in accordance with the principles of the present invention.

FIG. 1 illustrates a wire harness-making machine of the present invention, while FIGS. 7A–I illustrate the sequence of steps involved in the operation of the machine 100 in the assembly of wire harnesses, such as the wire harness illustrated in FIG. 6. The wire harness-making machine 10 produces the harnesses 10 by first terminating a series of first connector elements 14 to first ends 52 of a set of harness wires 12, establishing the length of the wires for the harness and cutting the wires to provide a series of free second wire ends 62. The distance between the first and second wire ends define the overall length for the finished harnesses. After the harness wires are cut, the wires are clamped by a wire transfer assembly 500 and transferred to another location of the harness-making machine where a series of second connector elements 15 are applied to the second wire ends 62 and terminated thereto while the first ends of a subsequent harness are terminated to a subsequent series of connector elements at the first termination station.

Returning to FIGS. 7A–7I and in particular, FIG. 7A, a preselected number of first connector elements 14 are advanced along a connector element advancement mechanism 202 (FIG. 8) and separated from chains of interconnected connector elements 38. The leading connector elements are cut from the chains and advanced into a first connector element transfer nest 304. The transfer nest 304 is positioned across from a first termination station 400. The first termination station includes a termination assembly 402 having a harness wire cutting mechanism 470. The transfer nest 304 is reciprocatably movable on guide rails 302 by a suitable motor 398. The transfer nest 304 is aligned with a first connector element advancement track 55 which extends transverse to the path which the transfer nest follows. At the same time, a set of second connector elements 15 is advanced into a second connector element feed assembly 700 and the leading row thereof is separated and moved into a second connector element transfer nest 612, which is advanced into position at a second termination station 600.

Figure 7B:
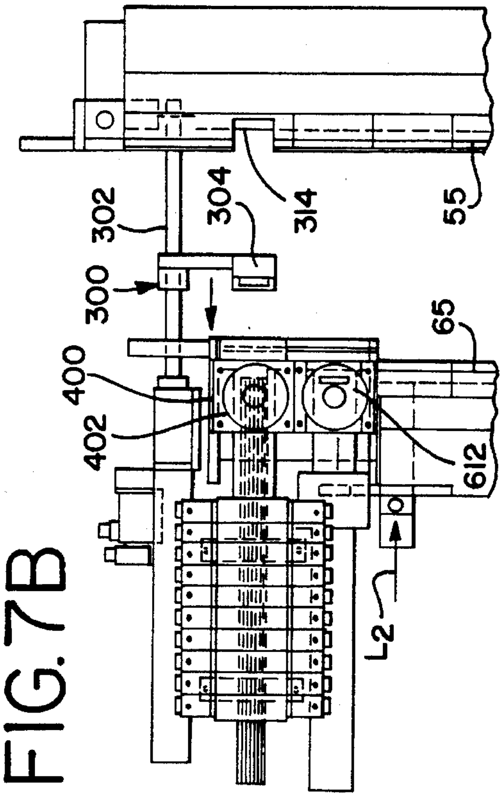

After the first transfer nest 304 has received an array 50 of first connector elements 14, as illustrated in FIG. 7B, the first transfer nest 304 is moved from the first connector element track 55 to the first termination station 400. A plurality of harness wires 12, having been driven by individual wire feed servo motors 70 through a wire guide assembly 800 in a preselected order to the first termination station 400, enter the first connector elements held in the transfer nest 304. Throughout the course of this detailed description, the term "first" shall refer to the connector elements and wire ends which are terminated together at the first termination station 400, and which are subsequently advanced along the first connector advancement track 55 shown at the right (FIGS. 7A–I) of the harness-making machine 100.

Figure 7D:
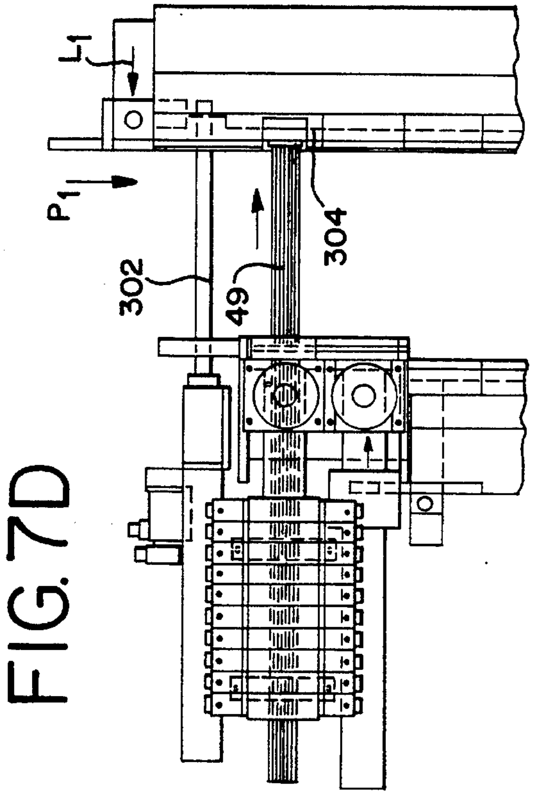
Figure 7A:
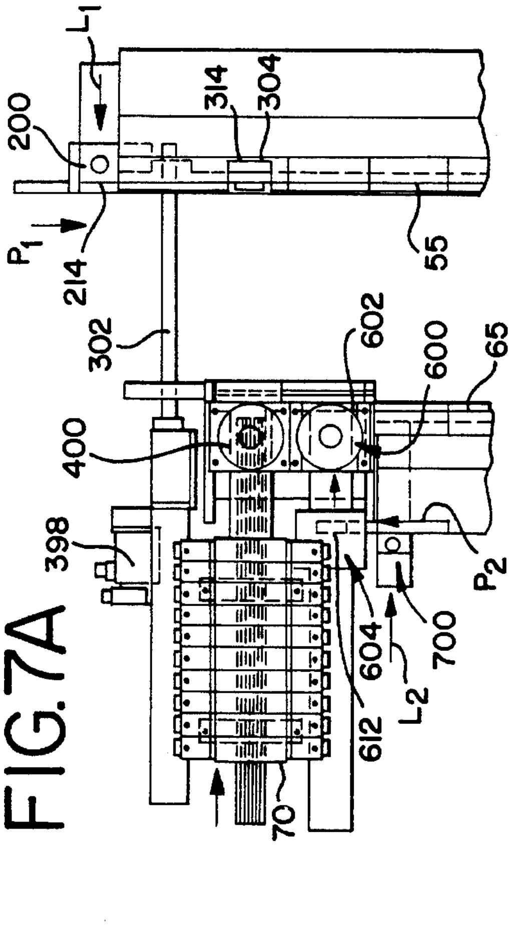
Figure 7C:
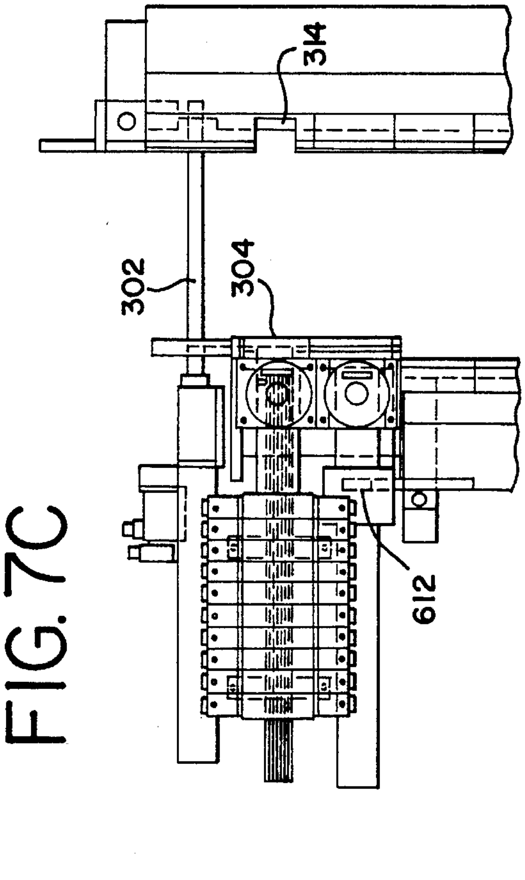
Figure 8:
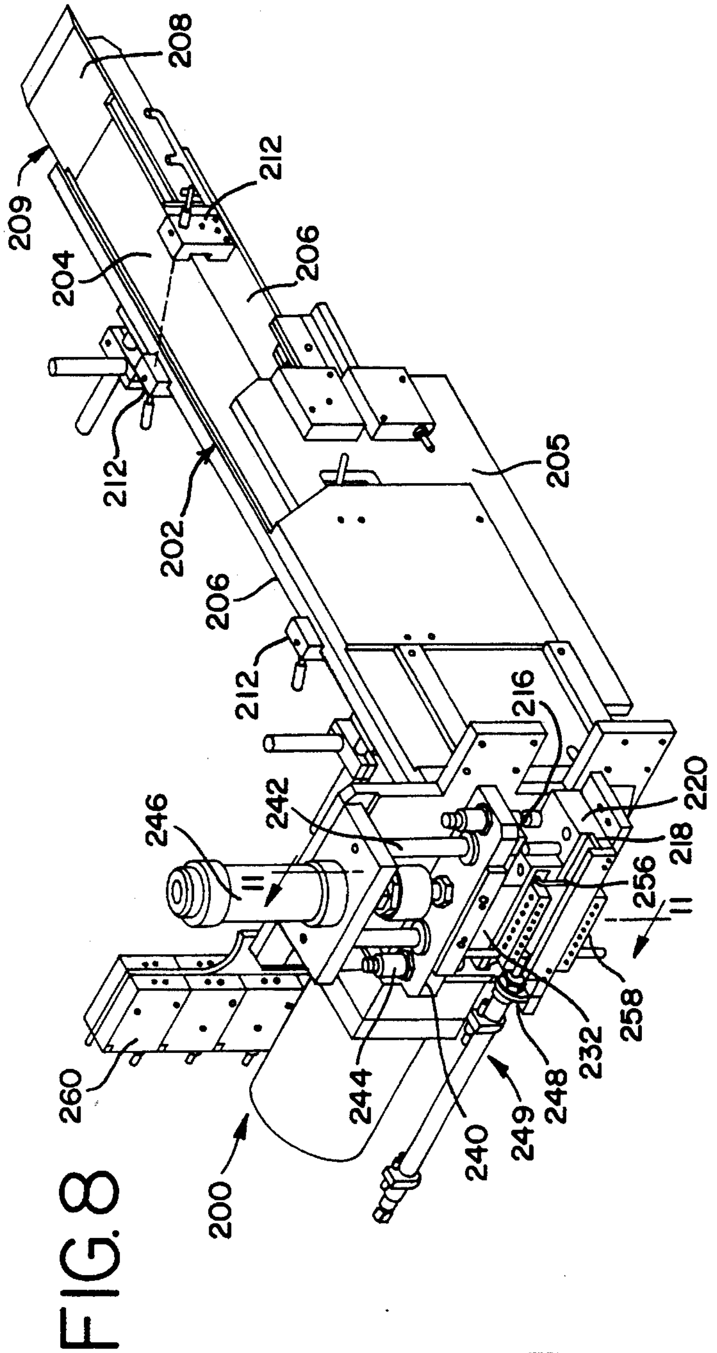
FIG. 8 is a perspective view of a feeding assembly of the wire harness-making machine of FIG. 1 in which successive arrays of first connector elements are separated from multiple supply chains of connector elements.
Figure 9:
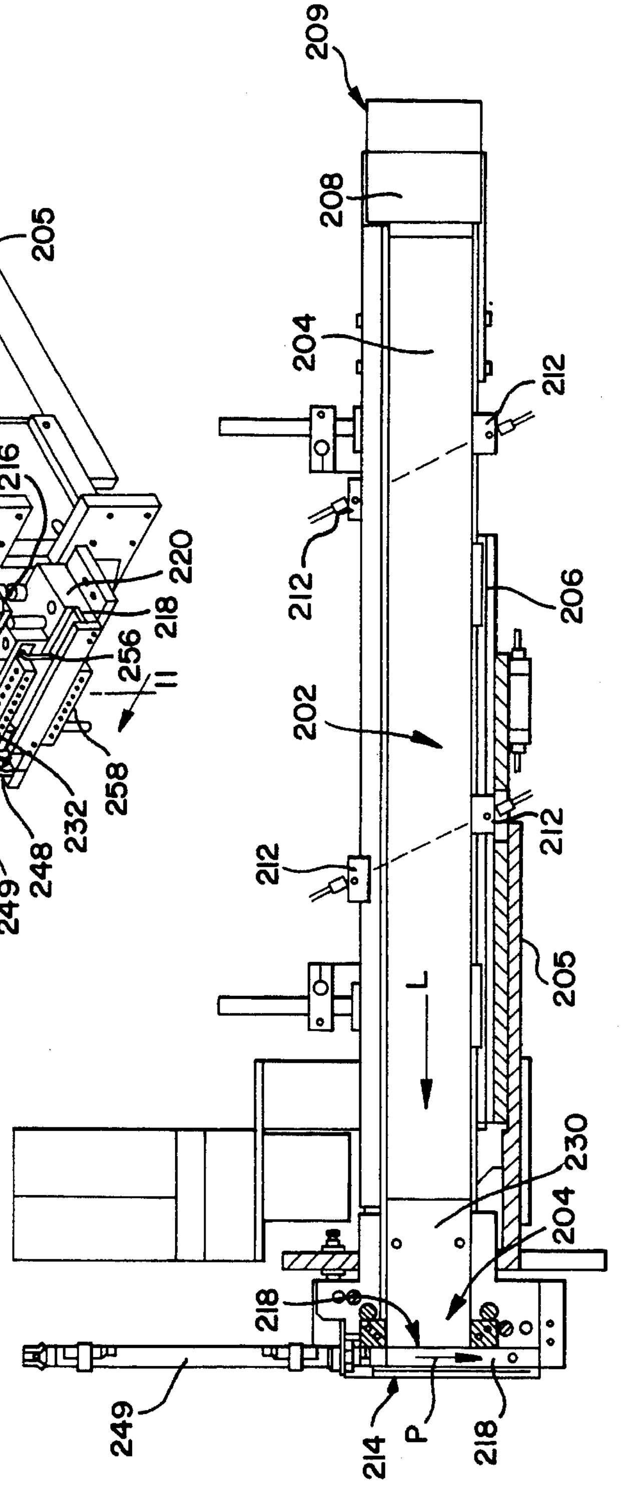
FIG. 9 is a plan view of the feeding assembly of FIG. 8 with a portion of the loading station removed for clarity.
Figure 10:
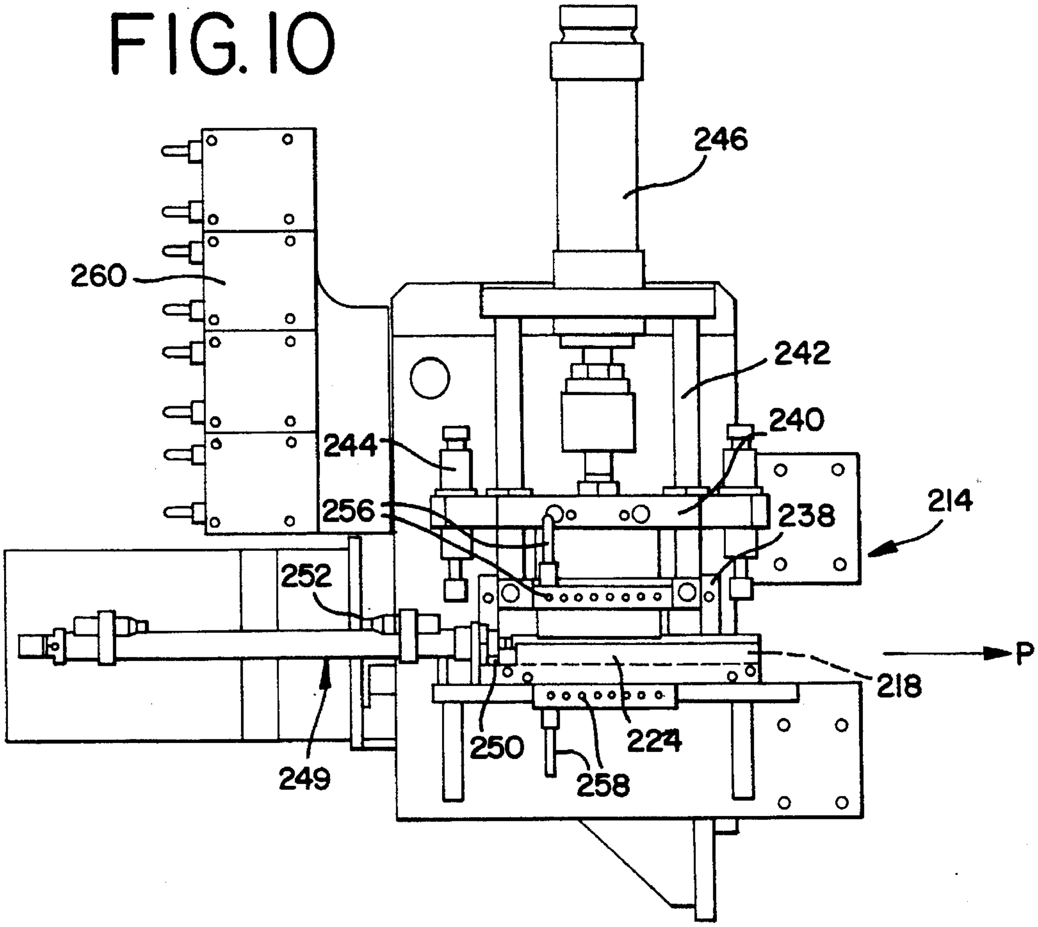
FIG. 10 is a front elevational view of the feeding assembly of FIG. 8.
Figure 12:
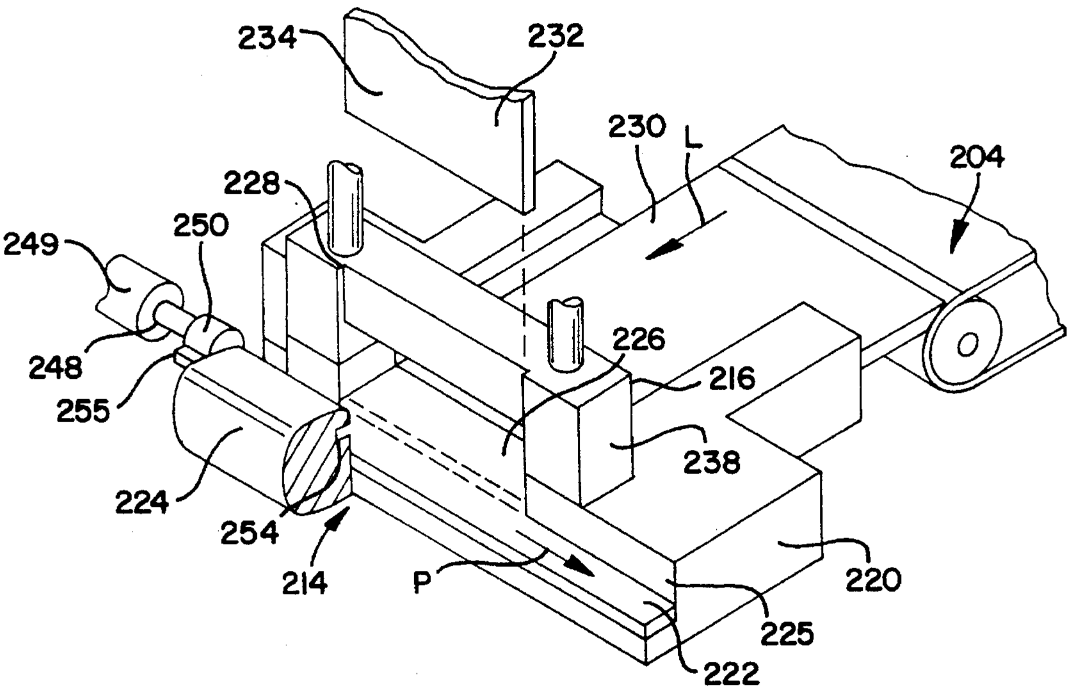
FIG. 12 is an enlarged perspective view of the intersection of the connector element advancement mechanism and the connector element feedpath with certain components removed for clarity.

As the nest 304 of first connector elements arrives at the first termination station 400, the first set of wire ends 52 of the harness wires 12 enters wire-receiving openings 20 of the first connector element array, which are aligned with the wire guides 818, 820 of the wire guide and shifting assembly 800. Upon insertion, the first wire ends 52 are terminated to the first connector elements 14 by pressing the head and base components 16, 18 together until they interlock together (FIG. 7C). The terminated first connector element array 50 is then shuttled back to the first connector advancement track 60 while harness wires 12 are fed from their respective feed supplies to thereby define the final length of the wires in the harness(es) (FIG. 7D). Once the predetermined length is achieved, the wires 12 are clamped and cut at the first termination station 400 to form a set of second wire ends 62 as well as a second or subsequent set of first wire ends.

Figure 7F:
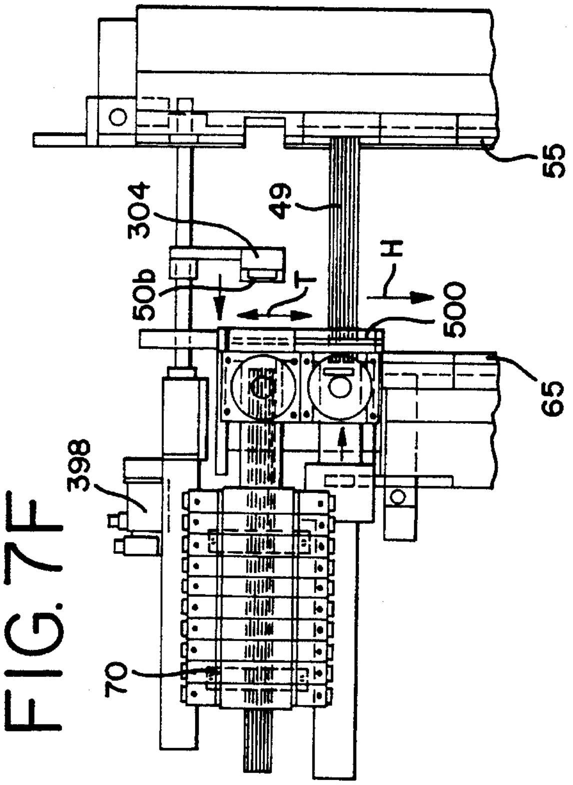
Figure 7H:
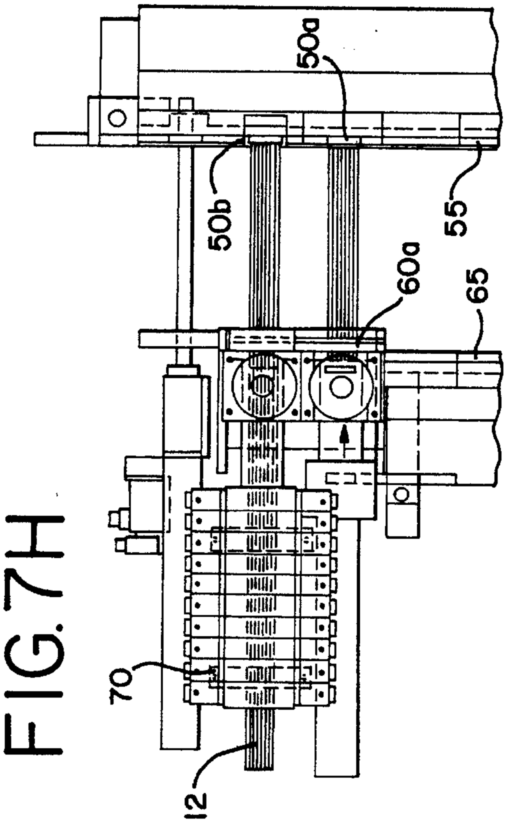
Figure 7E:
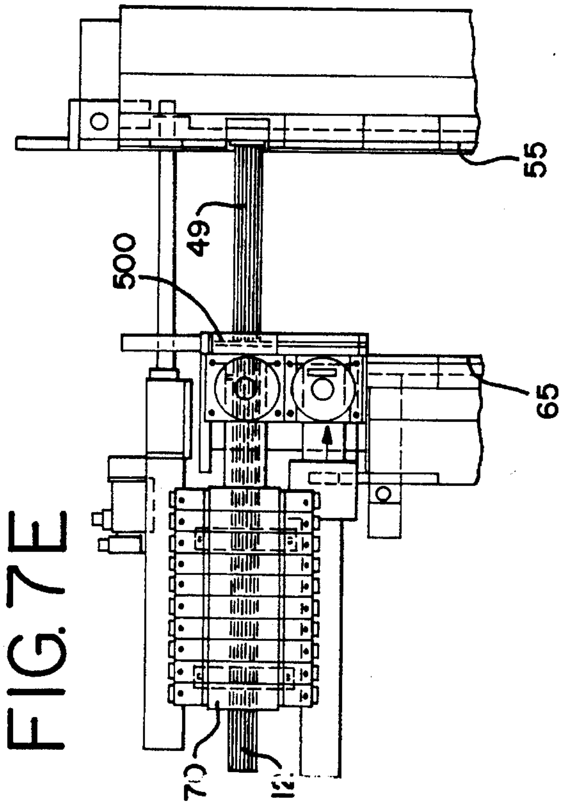
Figure 7G:
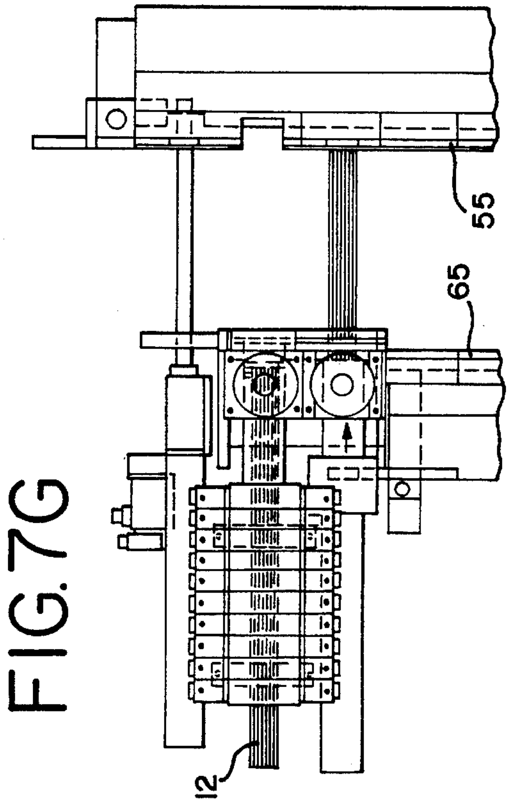

The transfer assembly 500 subsequently transfers the set of second wire ends 62 from the first termination station 400 to a second termination station 600 and maintains the alignment of the wire second ends 62 in their original order and in alignment to receive a plurality of second connector elements 15 (FIG. 7F). The subsequent set of first wire ends is maintained in position at the first termination station.

A successive first connector element array 60 is then loaded into the transfer nest 304 and shuttled from the advancement track 52 to the first termination station 400 (FIG. 7F). A second connector element array 60 is also loaded into a second connector element transfer nest which is aligned with the second termination station 600. The first and second connector arrays are then carried to their respective termination stations. The first and second termination stations are actuated to simultaneously terminate the array of second connectors to the prior harness and the subsequent array of first connectors is terminated to a subsequent harness. The completed wire harnesses are then transported along a production path H for further testing by virtue of their first connector elements engaging the first supply track and their opposing, second connector elements engaging the second supply track. Such testing may include, for example, coding, bending, polarizing and the like.

Figure 7I:
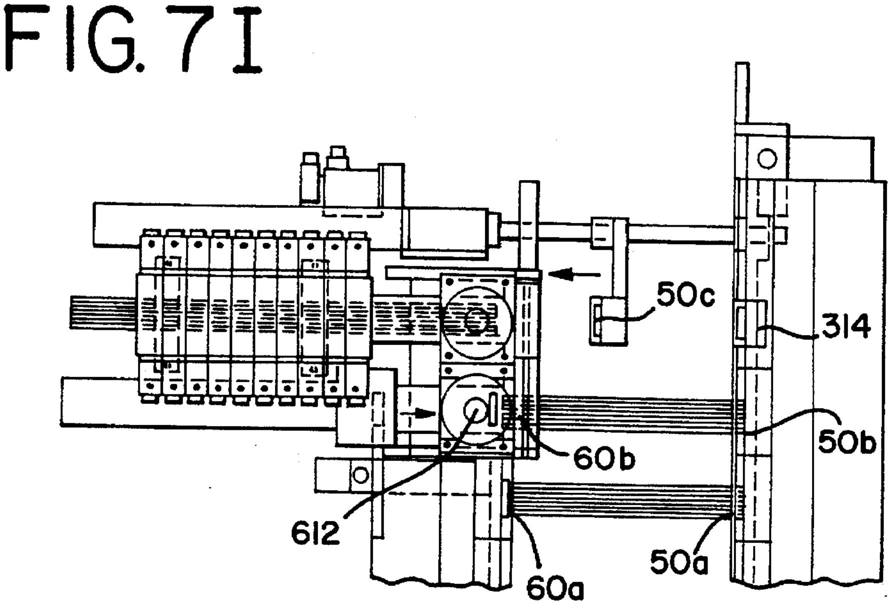
Figure 11:
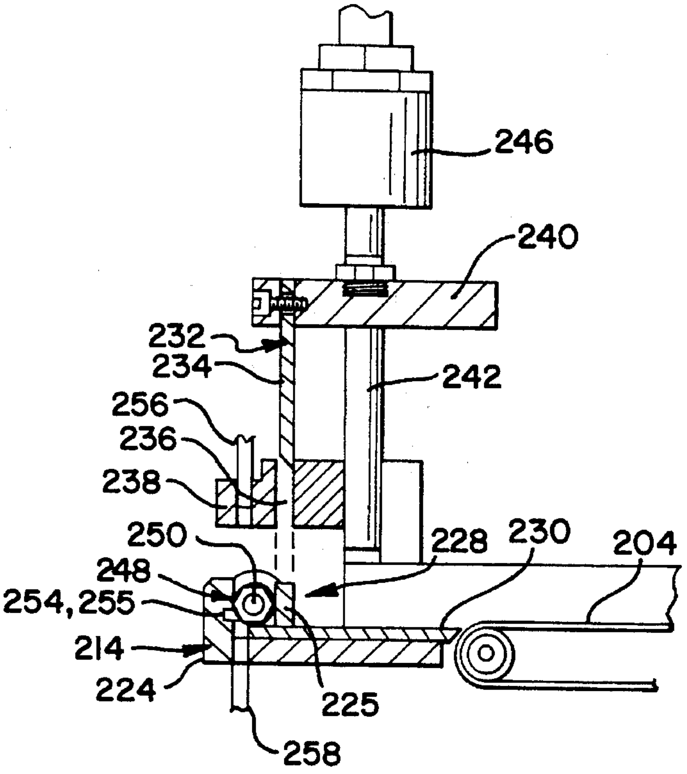
FIG. 11 is a sectional view of the loading station of the feed assembly of FIG. 8.

It should be noted that FIG. 7F is the normal starting position for all subsequent harnesses after the first one is terminated. In other words, after the first harness is terminated, the termination sequence would be from FIG. 7F through FIG. 7H and then back to FIG. 7F. As can be readily seen, FIGS. 7B, 7F and 7I are identical except for the number harnesses already terminated. As such, FIGS. 7A–7E are only accurate the first time the harness-making machine is turned on.

First Connector Element Feed Assembly

Referring now to FIGS. 8–12, the structure of the harness-making machine shall now be described, beginning with the feed assembly 200, which separates successive lead rows, or arrays, of connector elements 14 from the multiple supply chains 36 and successively feeds the separated arrays into position for processing by the first termination station 400.

Figure 4:
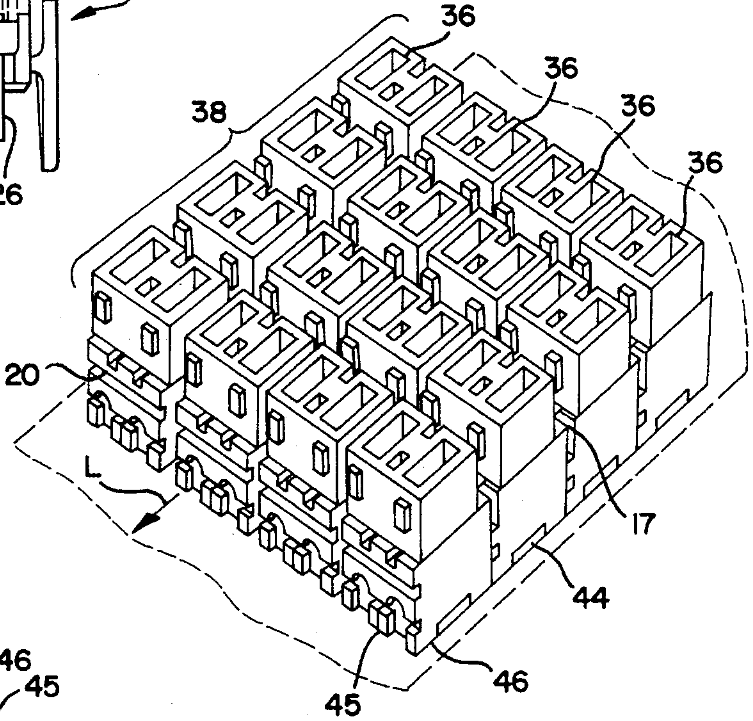
FIG. 4 is a perspective view of a feed supply of adjacent supply belts of interconnected connector elements suitable for use in the wire harness-making machine of the present invention.
Figure 5:
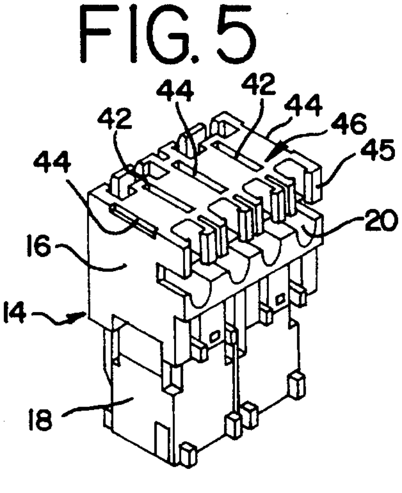
FIG. 5 is a perspective view of two connector elements arranged in side-by-side order and inverted to sow the bottom surfaces thereof.

The connector element supply chains 36 are arranged in side-by-side order wherein each connector element 14 is aligned with adjacent connector elements in adjoining supply chains 36 (FIG. 4). The connector element supply chains 36, taken as a whole, thereby define a supply mass 38, having series of successive rows of connector elements 14 extending perpendicularly to the axes $L_1$ of the supply chains 36 which make up the mass 38. The feed assembly 200 of the present invention separates successive lead rows of these connector elements 14 from the multiple supply chains 36 and feeds (or loads) the separated successive rows into a connector transfer nest 304 for transfer to a first termination station 400.

The feed assembly 200 includes a connector element advancement mechanism 202 in the form of an elongated conveyer 204 supported on a frame 205 and extending between two opposing sidewalls 206. The conveyor 204 extends generally parallel to the axes $L_1$ of the connector element supply chains 36. The connector element advancement mechanism 202 may includes an entrance chute 208 disposed at an entrance or upstream end 209 thereof which provides a smooth transition between a connector element supply station 210 and the conveyor 204.

The supply station 210 contains a plurality of connector housing supply chains 36 of the construction described above and illustrated in FIGS. 2–5. These multiple supply chains 36 are positioned at the entrance 209 of the advancement mechanism 202 by a suitable means in side-by-side order so that the connector elements 14 in each supply chain 36 are received on the conveyor 204. The connector element supply chains 36 preferably occupy the entire support surface of the conveyor 204 in a side-by-side order in successive rows, between the conveyor sidewalls 206. The sidewalls 206 may include a means for sensing the ends of the connector element supply belts 36, such as optical sensors 212 which project a beam of light at an angle across the conveyor 204, and which are preferably operatively connected to a control means (not shown) which monitors the operational status of the apparatus and which synchronizes the advancement mechanism 202 with other mechanisms of the feed assembly 200.

The advancement mechanism 202 leads to a connector housing separation and shuttle means, illustrated as a loading station 214, which is disposed near the exit or downstream end 216 of the conveyor 204. At the loading station 214, the lead rows of connector elements 14 are successively separated from the supply mass 38 and then transferred along a feed path $P_1$, generally perpendicular to the axis $L_1$ of the advancement mechanism. The feed path $P_1$ leads to the connector transfer nest assembly 300 stationed downstream of a feed channel 218.

The feed path $P_1$ of the loading station 214 is defined primarily by a base member 220 which extends across the exit 216 of the advancement mechanism 202. The base member 220 includes an elongated feed channel 218 defined therein. The feed channel 218 has a floor portion 222 which extends between two opposing parallel sidewalls 224, 225. The outermost sidewall 224 is generally continuous in its extent within the base member 220 for substantially the entire length of the feed channel 218. The innermost sidewall 225 is not continuous, but has an interruption 226 (FIG. 12) therein aligned with the conveyor 204. This interruption 226 defines a passage 228 which communicates with the connector element supply belt conveyor 204. An exit guide plate 230 extends between the conveyor 204 and the feed channel 218 to provide a smooth transition between the two components, and preferably is level with the channel portion 222. As illustrated in the drawings, it is preferred that the feed channel 218 and the advancement mechanism 202 intersect at the loading station 214 at a right angle thereto in order to permit uniform advancement of the lead rows of connector elements 14 into the feed channel 218.

The loading station 214 further includes means for separating the lead row of connector elements 14 such as a severing knife 232 which is driven in reciprocating movement along a line that projects along the edge of the feed channel 218. The severing knife 232 has an elongated blade portion 234 which is preferably at least equal to the width of the feed channel-conveyor passage 228. The knife 232 may be partially received within a guide slot 236 on a guide block 238 to maintain it in proper alignment with the feed channel-conveyor passage 228.

The severing knife 232 severs the bridging pieces 17 interconnecting successive connector elements 14 together and remains in place temporarily to close off the feed channel passage 228. While the passage 228 is closed off by the knife 232, the elongated blade portion 234 thereof defines a substantially planar surface to effectively fill the passage 228 and close off the feed channel interruption 226. The knife blade portion 234 therefore cooperates with the base member 220 to present a continuous sidewall which abuts the separated row of connector elements as they are driven from the feed channel 218 as explained below.

The severing knife 232 is supported on a mounting block 240, such as by bolts. The mounting block 240 and knife 232 reciprocate together along one or more guide posts 242. The guide posts 242 may include a pair of stop members 244 that limit the extent of travel of the severing knife 232. The severing knife 232 is driven in its reciprocating movement by a conventional fluid or air cylinder 246 which may be controlled by one or more proximity switches 247 operatively connected to the severing knife 232.

The loading station 214 further preferably includes a means for advancing successively separated rows or arrays of connector elements 14 along the feed path P, illustrated as a push rod 248 disposed within a fluid cylinder 249 which is mounted on the loading station 214 in alignment with the feed path $P_1$ of the feed channel 218. The push rod 248 includes an engagement head 250 which engages the severed lead rows of connector elements 14 in the feed channel 218 and moves them out of the feed channel 218 into a corresponding channel in the first transfer track 55 (FIG. 1). Accordingly, it is desirable that the stroke of the push rod 248 be of a length sufficient to push the entire row of severed connector elements out of the feed channel 218. A conventional proximity switch 252 is utilized to control the movement of the push rod 248 and generate a signal to a control means (not shown) indicating that the severed row of connector elements has been moved out of the feed channel 218 into the connector transfer nest assembly 300. The outer channel sidewall 224 includes a horizontal slot 254 which receives a guide 255 that extends laterally from the push rod engagement head 250 during its travel through the feed channel 218.

The loading station 214 may also include a means for verifying the presence or absence of each connector element 14 of the lead row of connector elements advanced into the feed channel 218 by the conveyor 204, illustrated as a series of optical sensors 256 mounted on the knife guide block 238 and aligned with the feed channel 218. These sensors 256 are aligned with a corresponding number of sensors 258 arranged at the feed channel 218 and have a plurality of transmission means attached thereto, such as fiber-optic cables extending therefrom to a bank of individual amplifiers 260. The sensors may be further connected to a means for generating an alarm in the absence of a connector element 14 in a portion of the feed channel 218, and further connected to a control means which can stop the conveyor 204 from advancing further once any one or more of the supply belts 36 has exhausted itself.

First Connector Element Transfer Nest Assembly

Figure 13:
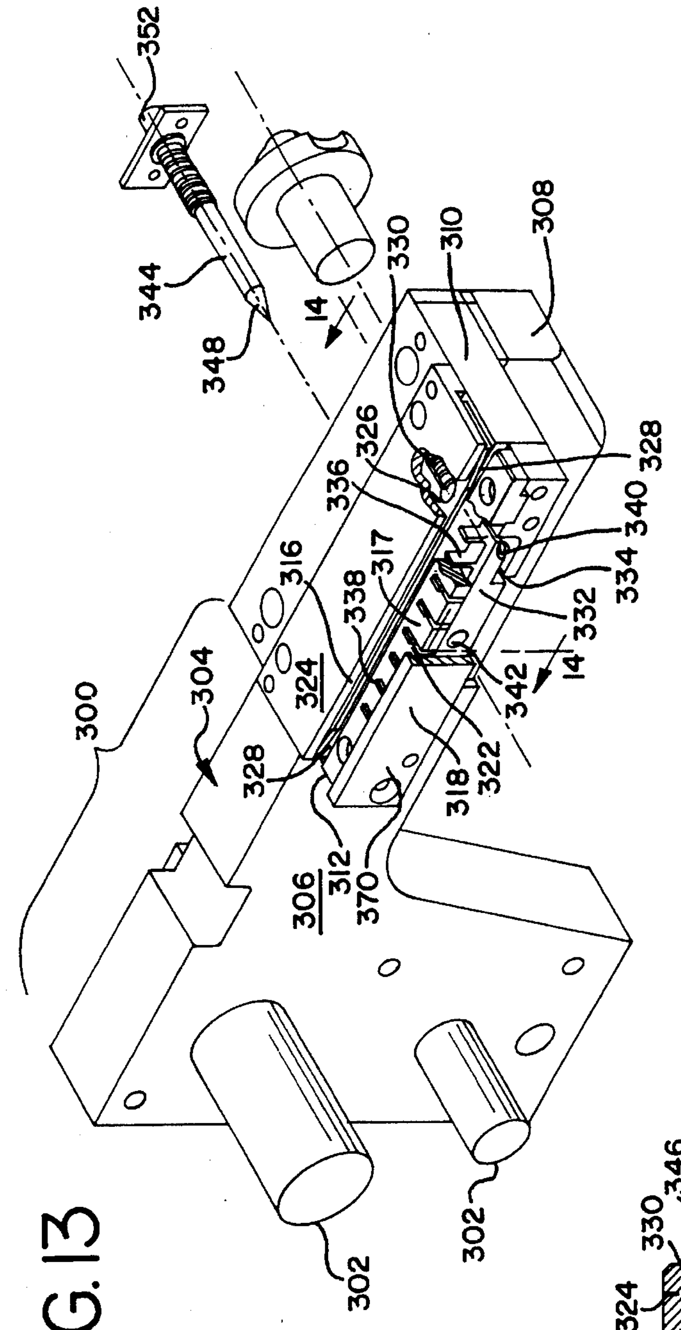
FIG. 13 is a perspective view of the connector element transfer nest assembly, partially exploded and partially in section, which reciprocates between the first connector element advancement track and the first termination station.
Figure 14A:
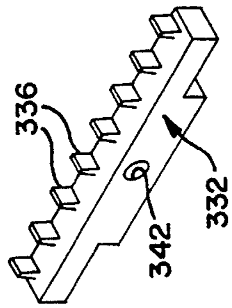
FIG. 14A is a perspective view of a connector element indexing means of the connector element transfer nest assembly of FIGS. 13 and 14.
Figure 14:
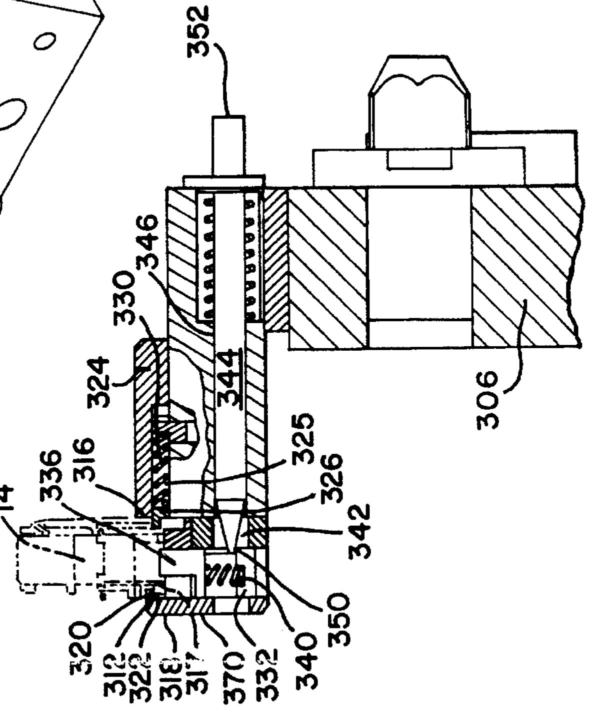
FIG. 14 is a sectional view of the connector element transfer nest of FIG. 13 taken generally along lines 14—14 thereof with a first connector element shown in place therein in phantom.

Turning now to FIGS. 13–14, a first connector element array transfer assembly 300 is illustrated, and includes one or more guide rods 302 which are mounted to the frame of the harness-making machine 100 and which extend between the two spaced-apart first and second connector element advancement tracks 55, 65 (FIG. 1). The guide rods 302 provide support for reciprocating connector element transfer nest 304 which reciprocates between the first connector element advancement track 55 and the first termination station 400. The connector element transfer nest 304 includes an L-shaped mounting block 306 which extends generally perpendicular to the guide rails 302. The block 306 includes an arm portion 308 at its outer end which supports an extending spacer portion 310 having a channel portion 312 disposed thereon. The channel portion 312 extends generally parallel to the arm 308 and fits within an opening 314 of the first connector element advancement track 55. The length of the nest channel 312 is selected to accommodate a desired number of first connector elements 14 which are separated from the first connector element supply mass 38 by the feed assembly 200. This set of separated connector elements constitutes a first array of connector elements which are applied and terminated to a first set of wire ends at the first termination station 400.

The channel portion 312 includes opposing inner and outer sidewalls, respectively 316, 318 and a floor portion 317 which extends therebetween. The outer sidewall 318 may include, as illustrated in FIG. 14, a ledge 320 which overhangs a portion of the channel floor 317 to define a longitudinal slot 322 therein. This slot 322 receives a projection 40 which extends out from the connector element base component 16. The inner channel sidewall 316 is primarily defined by a cover plate 324 having a similar longitudinal slot 325 therein that receives an elongated connector element pressure pad 326. The pressure pad 326 extends along the length of a channel 312 and has a ramped surface 328 disposed at each of its opposing ends. The pressure pad 326 may be biased by one or more compression springs 330 held within the slot 325.

When an array of first connector elements is advanced along the first connector advancement track 55 by the feed assembly push rod 248, the leading edge of the connector element contacts the pressure pad ramped surfaces 328 and force the pressure pad 326 partially back into the cover plate slot 325. The pressure pad 326 remains in contact with the connector elements in the channel 312 by virtue of the force exerted thereon by a compression spring 330. The pressure pad 326 thereby ensures that the connector elements are properly positioned in a transverse direction, within the transfer nest channel 312.

In order to properly locate and secure the first array of connector elements longitudinally within the transfer nest channel 312, the transfer assembly 300 further includes connector element indexing means in the form of an elongated pilot bar 332 that is located in a cavity 334 disposed beneath the channel floor 317. As shown most clearly in FIG. 14A, the pilot bar 332 has a plurality of connector element engagement members, illustrated as vertical engagement tabs 336. When in their raised position, these engagement tabs 336 extend upwardly through a series of slots 338 formed in the channel floor 317 and extend above the channel floor 317 a predetermined distance. These engagement tabs 336 engage corresponding grooves, or slots, 42, 44 formed in the bottom surfaces 46 of the connector element base component 16 and served to properly align the connector elements longitudinally within the transfer nest 304. The engagement tabs 336 also prevent the connector elements 14 from moving out of position from the transfer nest channel 312 during movement of the nest and during processing of the harness.

The pilot bar 332 is biased into its upward or raised position by one or more springs 340 disposed within the internal cavity 334. The pilot bar 332 preferably has an actuating means for automatically moving the engagement tabs 336 in and out of engagement with the connector elements, such as an opening 342 which receives an elongated cam, or actuating pin 344. The cam pin 344 is spring mounted within a cavity 346 and aligned with the pilot bar opening 342. The cam pin 344 has a conical forward surface 348 which impinges a ramped or generally frusto-conical surface 350 of the pilot bar opening 342. As the cam pin 344 is moved forwardly in cavity 346, the two opposing cam surfaces 348, 350 contact each other and the pilot bar 332 is forced down in the transfer nest cavity 334, thereby preventing the engagement tabs 336 from any contact with connector element grooves 42, 44 and thereby permitting connector elements to be moved in and out of the transfer nest channel 312.

This condition occurs primarily when the transfer nest 304 is in an alignment position with the first connector advancement track 55, wherein the rear end 352 of the cam pin 344 is contacted by suitably positioned stop member or surface such as a wall of the machine frame. Similarly, when the transfer nest 304 is moving toward or away from the first connector element advancement track 55, or in place at the first termination station 400, no external force is applied to the cam pin 344, and its return spring 345 thereby maintains it in a return position wherein the camming surfaces 348, 350 are substantially out of contact with each other and the engagement tabs 336 extend through the channel floor 317 into engagement with the connector element grooves 42, 44.

Figure 15:
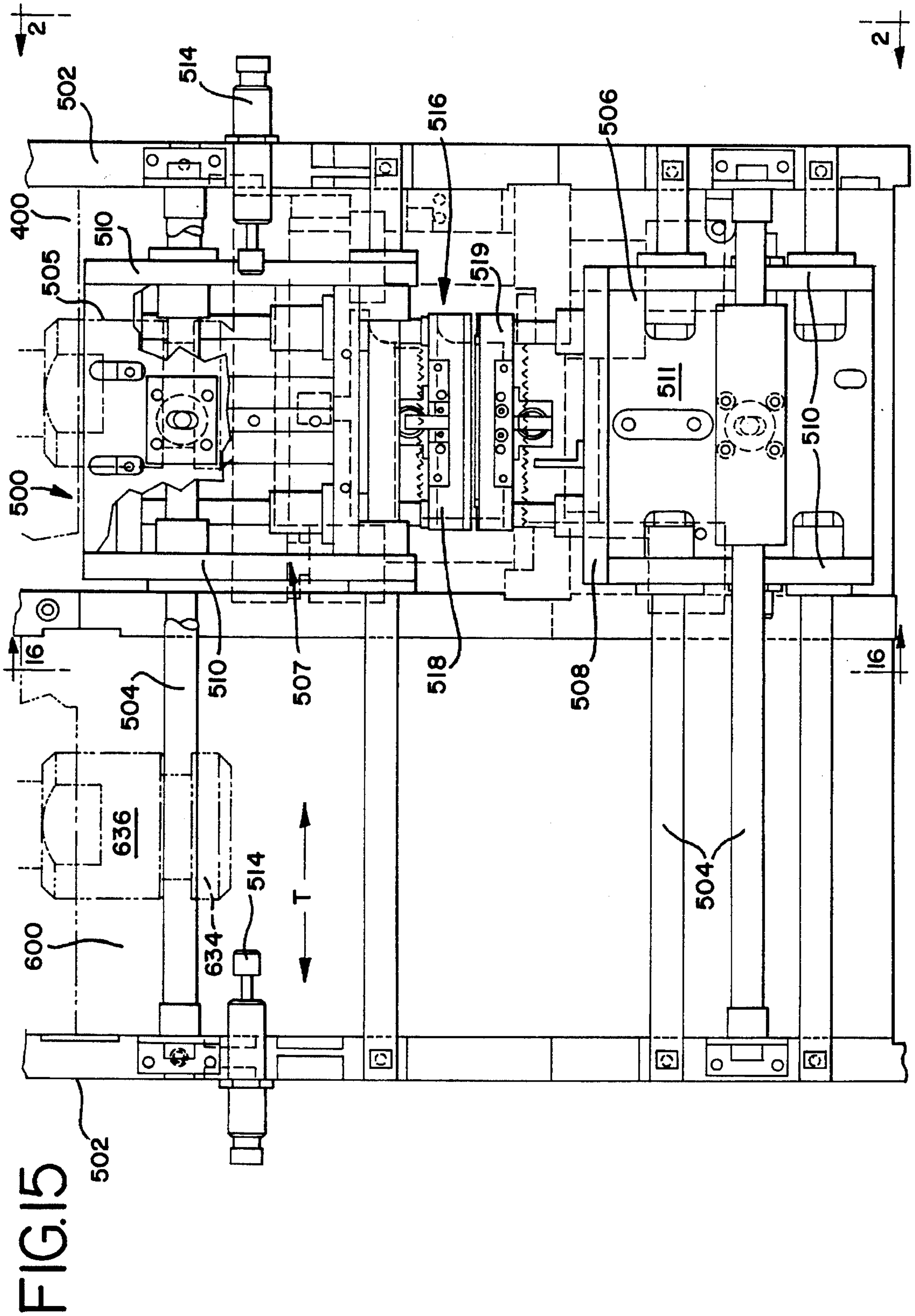
FIG. 15 is an elevational view looking from the front of the wire transfer assembly of the wire harness-making machine and illustrated in front of the first termination station thereof.

Transfer Assembly for Transferring Partially Completed Wire Harness Between First and Second Termination Stations As illustrated in FIG. 15, a wire transfer assembly 500 is mounted upon the frame 502 of the harness-making machine 100, and is generally disposed in front of the first and second termination stations 400, 600, shown in phantom. The transfer assembly 500 includes a plurality of guide rails 504 which extend between the frame members 502, and provide a path T along which the wire transfer assembly 500 reciprocates between the first termination 400 station where successive first sets of wire ends are terminated to corresponding first arrays, or rows of connector elements, and a second termination station 600 where successive arrays of second connector elements are terminated to the opposing second sets of harness wire ends. The press rams 402 and 636 of the first and second termination stations, respectively, are shown in phantom.

The transfer assembly 500 is shown as having two components: an upper component 505 and a lower component 506, each of which is mounted upon the guide rails 504. The two transfer components 505, 506 each include respective carriage portions 507, 508 formed between opposing structural plates 510 interconnected by transverse stiffener plates 511. These two transfer carriages 507, 508 are preferably pneumatically-operated in their movement between the first and second termination stations 400, 600, utilizing a suitable arrangement of air supply hoses 512, pistons and the like. Shock absorbers 514 may be mounted on either the frame 502 or the components 505, 506 in order to provide a cushioning, or regulated stopping force, to the upper and lower transfer assembly carriages 507, 508. These shock absorbers 514 engage stop members formed either by opposing surfaces of the structural plates 510 or by opposing members applied to the frame 502. The shock absorbers 514 or their associated stops may be interconnected by conventional means to a control system which controls the transfer assembly 500 in order to monitor the position of the transfer assembly components during operation as well as synchronize its operational movements with the other assemblies of the machine 100.

Figure 16:
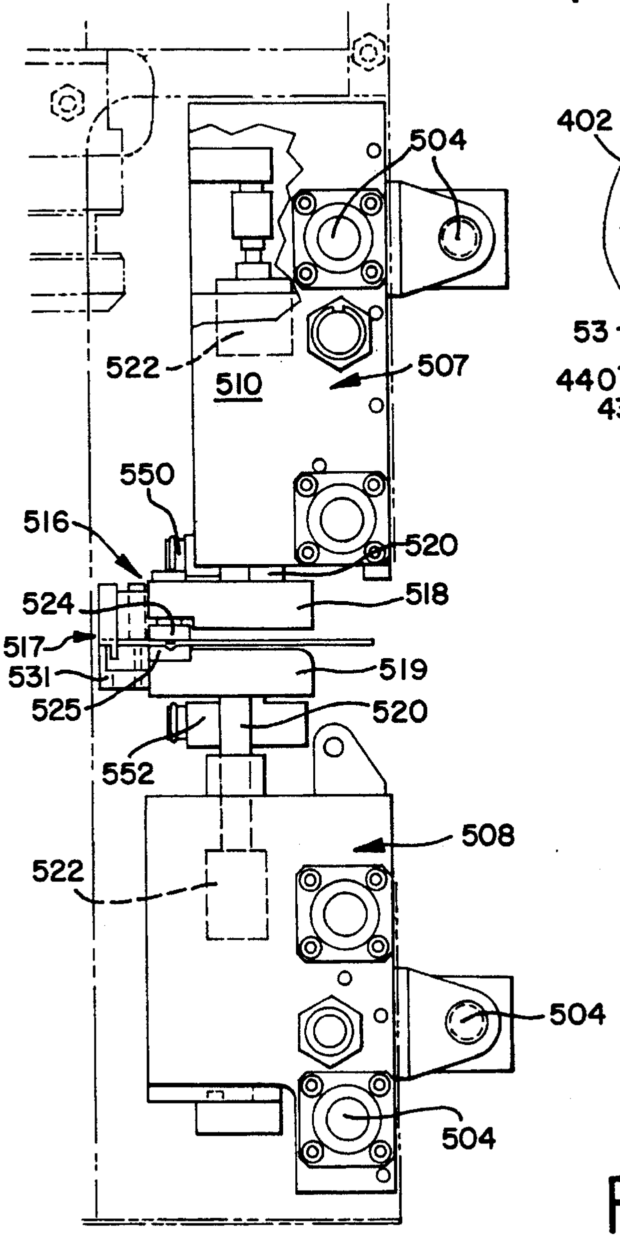
FIG. 16 is a side elevational view of the wire transfer assembly of FIG. 15 taken along lines 16—16 thereof.
Figure 21A:
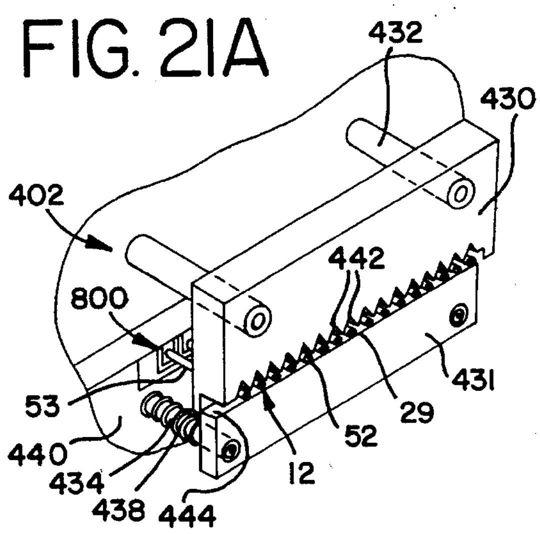
FIG. 21A is an enlarged perspective view of the termination assembly wire locator and support.
Figure 18:
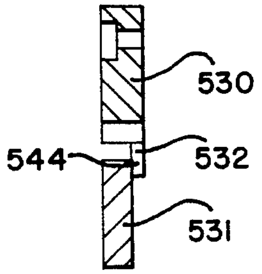
FIG. 18 is a sectional view of the wire locator and support of FIG. 17, taken generally along lines 18—18 thereof.
Figure 17:
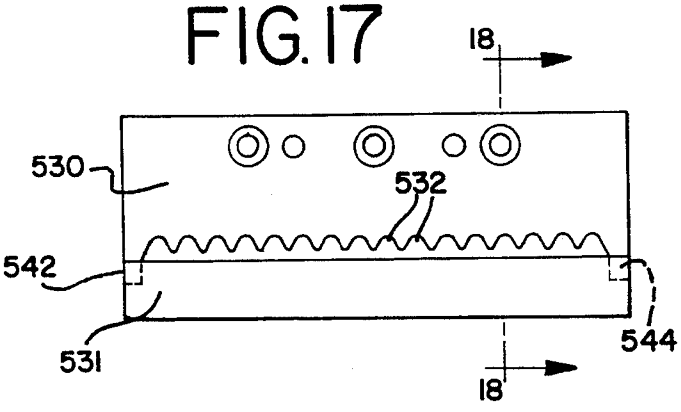
FIG. 17 is a front elevational view of the wire locator and support of the transfer assembly of FIGS. 15 and 16.
Figure 19A:
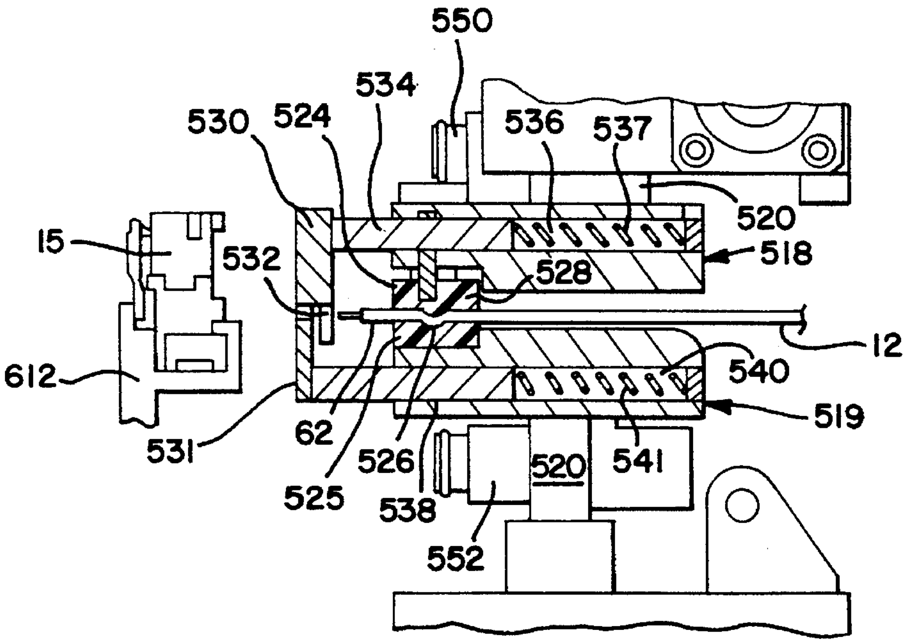
FIG. 19A is a sectional view of the clamping head portion of the wire transfer assembly shown in a clamping position after the harness wires have been cut to define the second set of wire ends and immediately prior to termination at the second termination station of the harness-making machine.
Figure 19B:
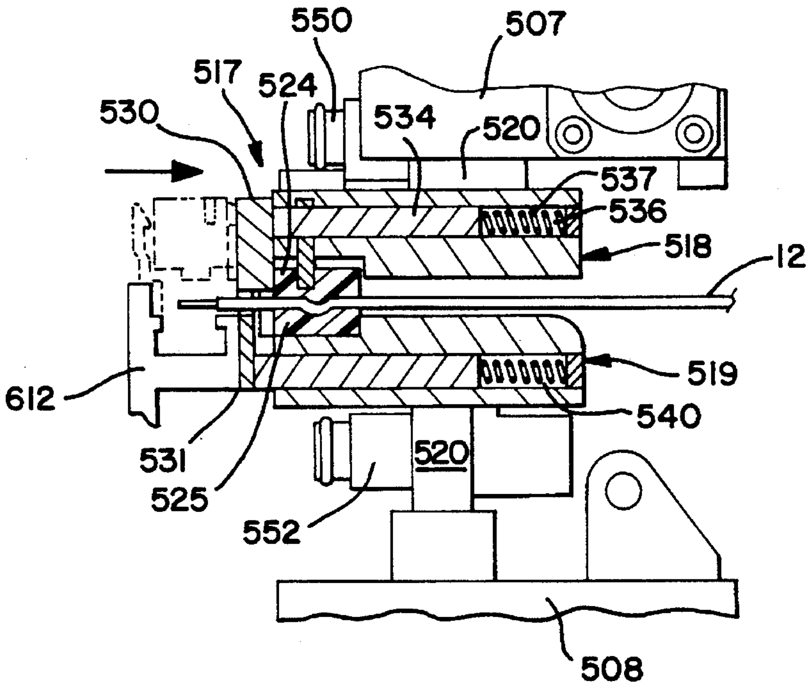
FIG. 19B is a sectional view of the clamping head portion at the second termination station illustrating the wire free ends inserted into a connector and ready for termination to second connector element.

The transfer assembly 500 preferably includes a wire clamping mechanism 516 in the form of a clamping head 517 having opposing clamping members 518, 519 which are slidably mounted on respective vertical guide posts 520 of each transfer carriage 507, 508 through the use of pneumatic cylinders 522. The two opposing clamping members 518, 519 are best illustrated in FIGS. 16 and 19A–19B. Each of the clamping members 518, 519 includes respective base portions which in turn include respective top and bottom clamping plates 524, 525 made of rubber or another compliant material. The bottom clamping plate 525 preferably is formed with a longitudinal groove 526 which receives the bottom portions of a plurality of harness wires 12 held within the transfer assembly 500. Similarly, the top clamping member base portion includes an opposing clamping plate 524 having a longitudinal protuberance 528 extending therefrom and disposed therein in general alignment with the bottom clamping plate groove 526. When the clamping members 505, 506 are brought together vertically along the guide posts 520, the harness wires 12 are held in place between the opposing groove and protuberance.

Importantly, the clamping head 517 includes means for accurately positioning and gripping the harness wires 12 therein comprising a wire locator 530 and a corresponding wire support 531. Each of said locator and support includes elongated bars are collapsible upon their respective clamping members 518, 519 in a direction generally parallel to the axes of the harness wires 12 and generally perpendicular to the longitudinal axes of the two clamping plates 524, 525. The wire locator 530 includes an elongated grooved bar having a plurality of slots, or grooves 532, formed therein along a lower surface thereof. The wire locator 530 is mounted upon a pair of slider rods 534 which are received within corresponding bores, or recesses 536, of the top clamping member 518 and may abut compression springs 537 to provide the wire locator 530 with its collapsible action. In addition, a pneumatic cylinder 550 is provided to retract and extend wire locator 530.

Similarly, the bottom clamping member 519 also includes a collapsible wire support 531 in the form of an elongated bar, supported by a pair of slider rods 538 which are also received in similar bores 540 and which abut compression springs 541. As with wire locator 530, support 531 also is operatively driven by a pneumatic cylinder 552 for retracting and extending the bar as described below. The support bar 531 supports the harness wires 12 at their second free end portions along an upper surface thereof.

Ends 542 of the support bar 531 engage the wire engage the wire locator 530 at two recesses, or steps 544, formed therein at opposite ends. Thus, whenever the wire support bar 531 is contacted by the second transfer nest, the contact causes the wire support bar 531 as well as the wire locator 530 to collapse onto the clamping head. After termination of the second connector elements, the second nest is moved away from the wire support 531. This permits the springs 541 to return the wire support 531 and wire locator 530 to their initial positions.

Clamping and Cutting Assemblies at First Termination Station

Figure 21:
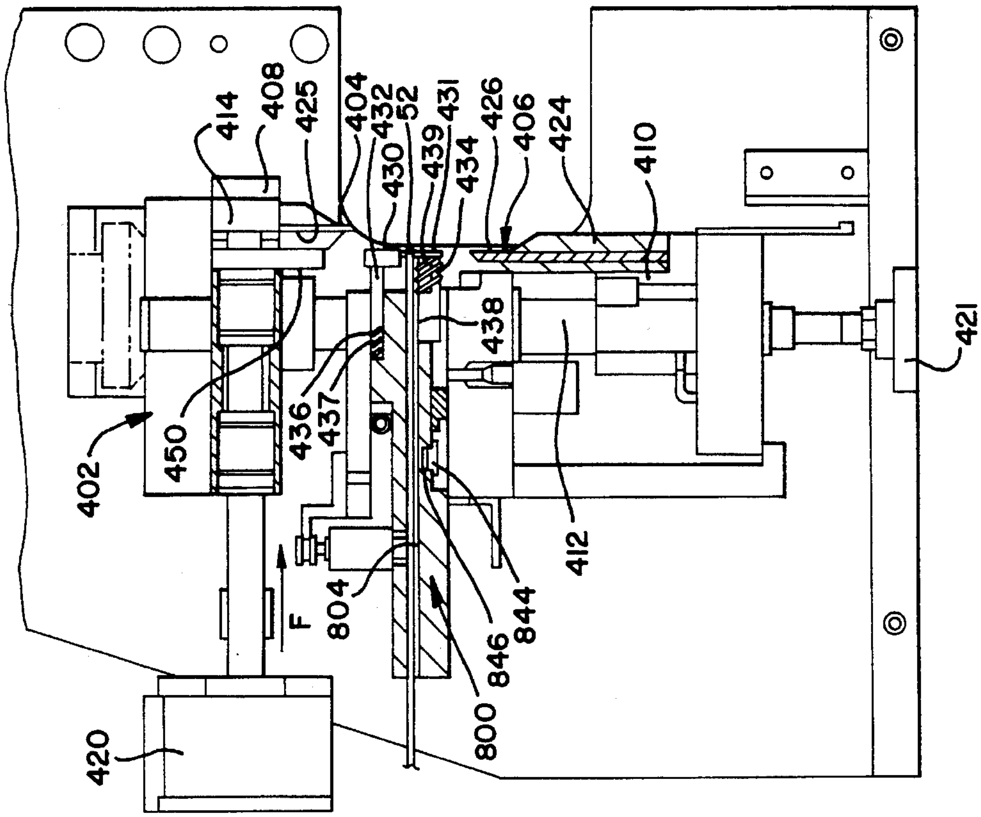
FIG. 21 is a partial sectional view of the first termination assembly of FIG. 20 taken generally along lines 21—21 thereof.

As shown in FIG. 21, a stationary wire guiding mechanism 450 is located at the first termination station 400. Such stationary wire guiding mechanism includes slidable wire locator 456 and slidable wire support 458. Locator 456 and support 458 operate substantially identically to wire locator 530 and wire support 531 except they are contacted by the first transfer nest 304 and they guide the first free ends of the wires that will be terminated to the first array of connector elements 14 rather than the second free ends and the second array of connector elements 15. However, unlike the wire locator 530 and wire support 531 that are connected to pneumatic cylinders 550, 552 to cause them to extend and retract, the locator 456 and support 458 cannot be automatically retracted. Instead, after the first transfer nest 308 contacts support 531 and forces both locator 456 and support 458 towards wire shifting mechanism 800, a pneumatic cylinder 460 is actuated to force a pin 462 upward into a recess to prevent locator 456 and support 458 from springing back once first transfer nest 308 moves towards its "home" position in line with first transfer track 55.

First Wire End Termination Assembly

Figure 20:
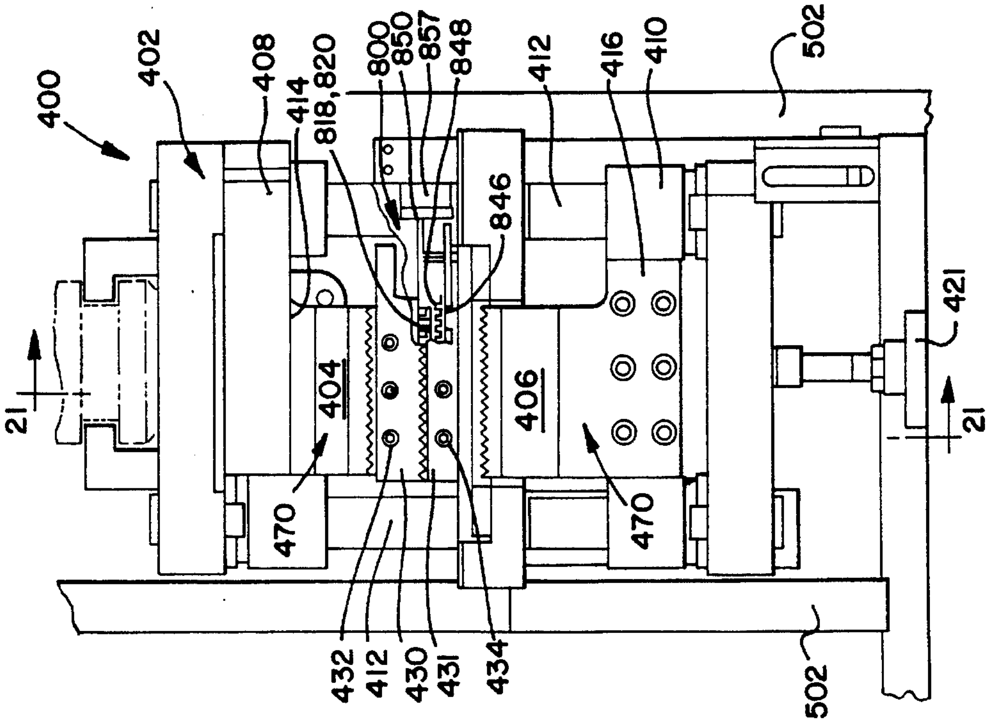
FIG. 20 is a front elevational view of the first termination assembly of the wire harness-making machine of FIG. 1.

Now referring to FIGS. 20 and 21, the first termination station 400, supported within machine frame members 502, is illustrated as having a termination assembly 402, a means 450 for clamping wires (described above), a means 800 for shifting wires and a means 470 for cutting harness wires 12 fed to the termination station 400. The harness wires 12 are engaged by a plurality of individual wire feed motors 70 which serve to advance the wires upon a control signal from a control means 75 which is synchronized with the feed assembly 200 and other assemblies of the harness-making machine 100.

The termination assembly 402 includes a cutting assembly 470 which includes upper and lower cutoff blades 404, 406 which are mounted on respective upper and lower die members 408, 410 slidably supported on vertical guide posts 412. Each die member 408, 410 includes a recess 414, 416 through which the blade portions of the cutoff blades 404, 406 project. The upper die member 408 houses a blade shift mechanism 418 which include an extendible pneumatic cylinder 420 which reciprocally moves the upper blade holder 414 in which the upper cutoff blade 404 is mounted to the die member 408. The cylinder permits the upper cutoff blade 404 to move horizontally along the wire feed path F. The lower cutoff blade 406 is horizontally fixed in its movement by its associated lower blade holder 424 which is operatively connected to the lower die member 410, and thus its movement is limited to vertical reciprocating movement caused by pneumatic cylinder 421. During a cutting operation, cylinder 420 retracts blade 404 so that it is positioned along the cutting plane. The two cutoff blades 404, 406 are aligned so that their opposing contact surfaces 425, 426 abut each other during a cutting stroke when the upper cutoff blade 404 is urged down and the lower cutoff blade 406 is urged up. This relationship ensures a reliable and clean cut of the harness wires advanced through the termination assembly 402 by the wire feed motors 70.

A wire guide and shifting assembly 800 may be associated with the termination station 400 and disposed in alignment therewith upon a base plate 428. The wire guide and shift assembly 800 includes a pedestal portion 802 having a plurality of wire guides 818, 820 disposed thereupon, and each wire guide defines an elongated channel 812. The wire guides 818, 820 may or may not be laterally shiftable upon the pedestal portion 802. If the wire guides are intended to be shiftable, a suitable actuating member 846 is provide underneath the pedestal portion which engages specific wire guides which are intended to be shifted. The wire guides 818, 820 serve to direct and orient the harness wires 12 during movement through the termination station 400, such as that which occurs during feeding of the wires after termination when the first connector element transfer nest 304 returns to the first connector element transfer track 55.

The first termination station also includes a termination ram 450 actuated by a power cylinder 452. The ram 450 descends down into contact with the head component 18 of the connector element 14 held within the first transfer nest 304. The ram 450 exerts a sufficient amount of force down on the head component 18 to force it into secure engagement with its base component 16 to thereby terminate the terminals within connector elements 14 to the harness wires 12. Upon raising ram 450, the connector elements 14 are returned to the first connector element transfer track 55 by the first connector transfer nest 304, whereupon, the first connectors 14 are advanced along the track 55 by a conventional transfer beam mechanism 480 which engages the connectors 14 while the harness wires are advanced by the transfer assembly 500.

Second Connector Element Transfer Assembly And Termination Station

Figure 22:
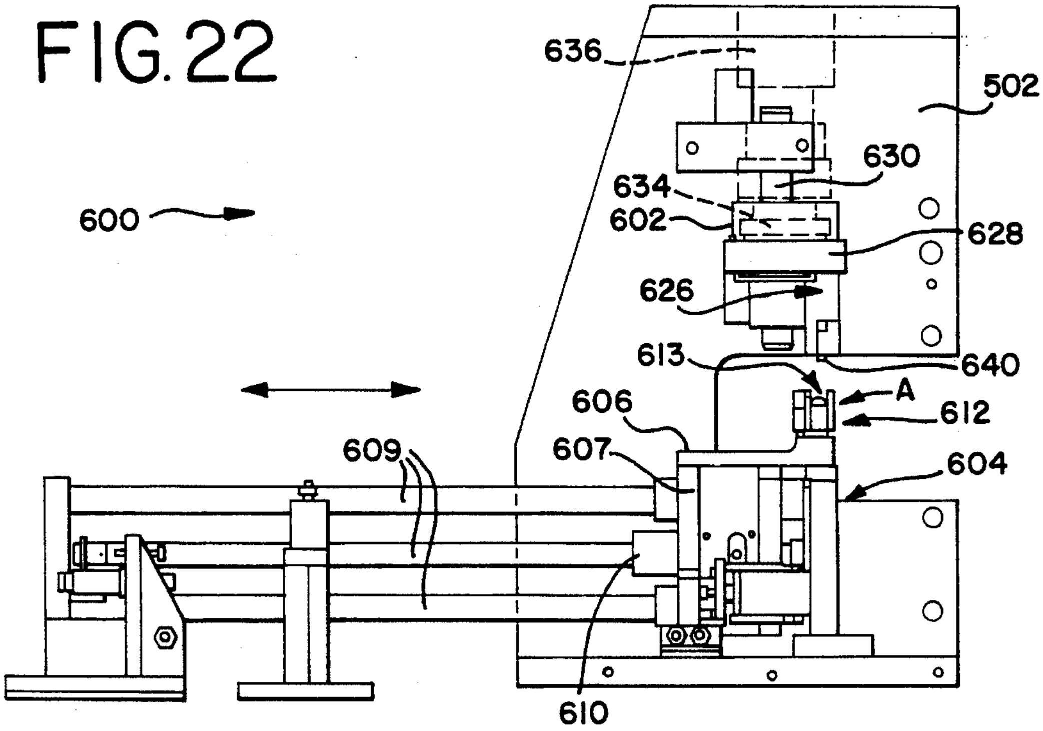
FIG. 22 is a side elevational view of the second termination assembly with the second connector element transfer assembly in place therewithin in a termination position.
Figure 23:
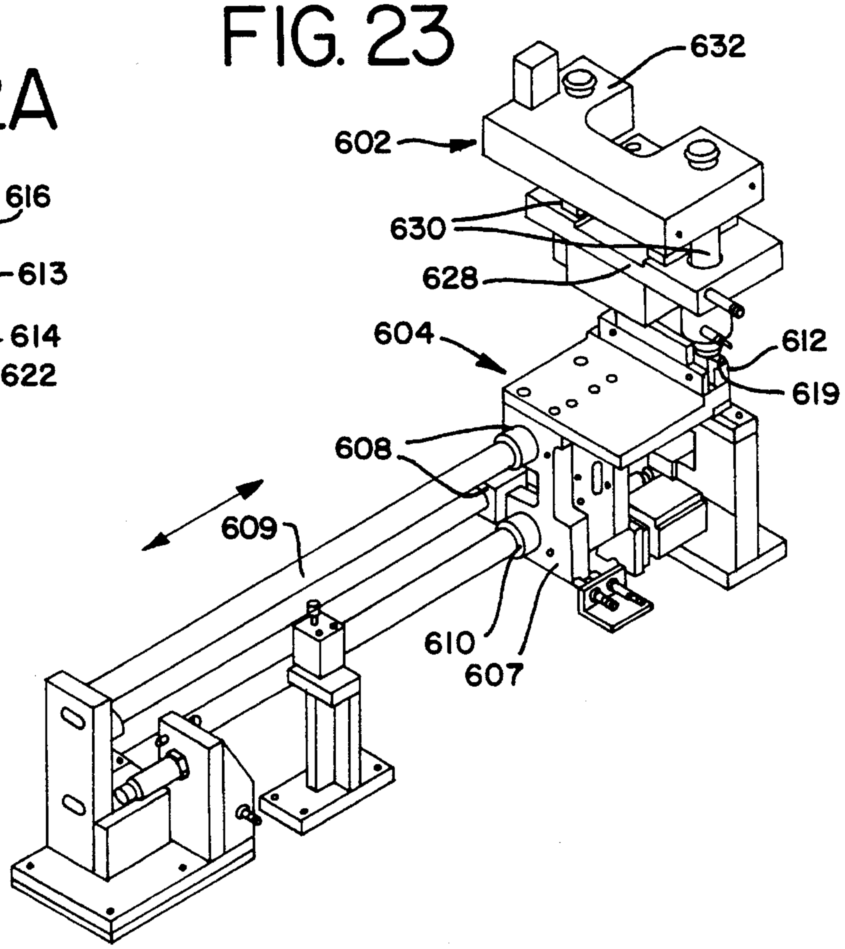
FIG. 23 is a perspective view of the second connector element termination and transfer assembly of FIG. 22.

FIGS. 22–23 illustrate the second termination station 600 in which a termination assembly 602 is mounted to the machine frame members 502. The termination assembly 602 reciprocates vertically into and out of contact with a second array of connector elements 65 held within a second connector element transfer assembly 604 which reciprocates between a second connector element feed assembly 700 and the second termination assembly 602. Focusing specifically on the second connector element transfer assembly 604, it can be seen that the assembly includes a transfer nest support block 606 having one or more slide plates 607 extending transversely downwardly therefrom. The slide plates 607 have a plurality of openings 608 which accommodate a like number of guide rods 609 therein. The openings 608 may include suitable slide bearings 610 to assist in smooth movement of the transfer assembly 604 in its reciprocating movement.

The nest support block 606 includes, at its outer end, a second connector element nest 612 having a connector element receiving channel 613 defined between an outer sidewall 614 and an inner sidewall 615. The structure of this nest 612 is similar to the first connector element transfer nest 304 in that the outer sidewall 614 has a longitudinal slot 616 formed therein which receives a lower foot 45 of the connector elements. A spring-biased pressure pad 617 is held within a slot 618 of the channel inner sidewall 615 and applies pressure to the second connector elements in the same manner as its counterpart 326 of the first connector element transfer nest 304. Ramped surfaces 619 at the ends of the pressure pad 617 permit the second connector elements to move the pressure pad 617 in and out of the slot 618 (FIG. 23).

Figure 22A:
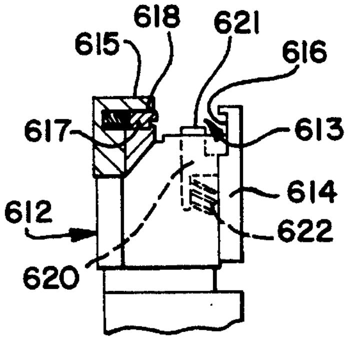
FIG. 22A is an enlarged view, partially in section, of area "A" of FIG. 22 showing the second connector element transfer nest in detail.

As illustrated in FIG. 22A, the nest 612 also contains an elongated pilot bar 620 substantially identical to bar 332 of first transfer nest 304 with a plurality of engagement tabs 621 extending upwardly therefrom which is biased by one or more biasing springs 622. The nest 612 is substantially identical to first transfer nest 304 except it utilizes different means for moving pilot bar 620 and its engagement tabs 621 downward. A first pneumatic cylinder (not shown) is located adjacent the second connector feed track 702 and a second pneumatic cylinder (not shown) is located adjacent the second termination station 600 to permit the arrays of second connectors 15 to be discharged from the second transfer nest to the second transfer track 65. Upon actuating either of these cylinders with the second transfer nest positioned thereon, the pilot bar 620 and tabs 621 move downward to free the connectors 15. The engagement tabs 621 are biased upwardly into the second connector elements during the travel of the nest along the guide rods 609 and are actuated into a retracted position after termination so that the completed wire harnesses may be advanced along the first and second connector element advancement tracks 55, 56.

The guide rods 609 include a support stop member 624 disposed in alignment with the termination assembly 602 so that the transfer nest 612 is aligned with a termination ram 626. The termination ram 626 is mounted on a die plate 628 which is reciprocatable along two guide posts 630. The die plate 628 includes a termination gib 632 which engages an engagement head 634 (shown in phantom) of a pneumatic cylinder 636 which drives the termination assembly 602 in its movement.

Second Connector Element Feed Assembly

Figure 25:
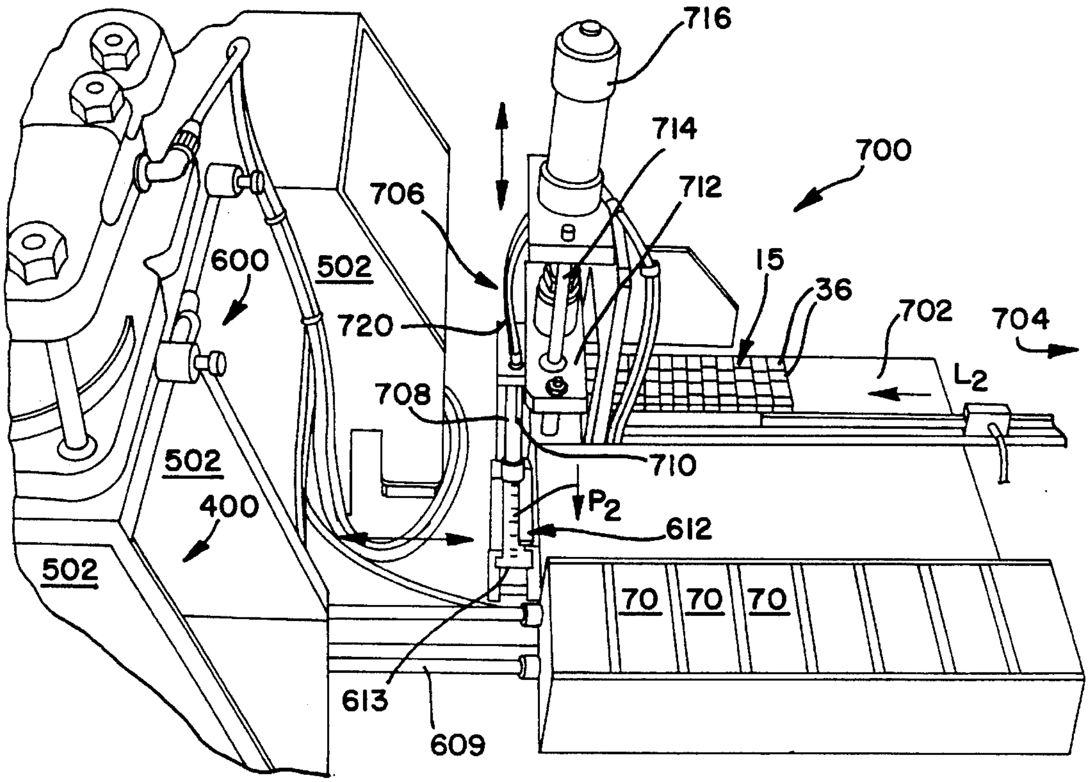
FIG. 25 is a perspective view taken from above of the second connector element feed assembly in place behind the second termination station and in alignment with the second connector element transfer nest.
Figure 26:
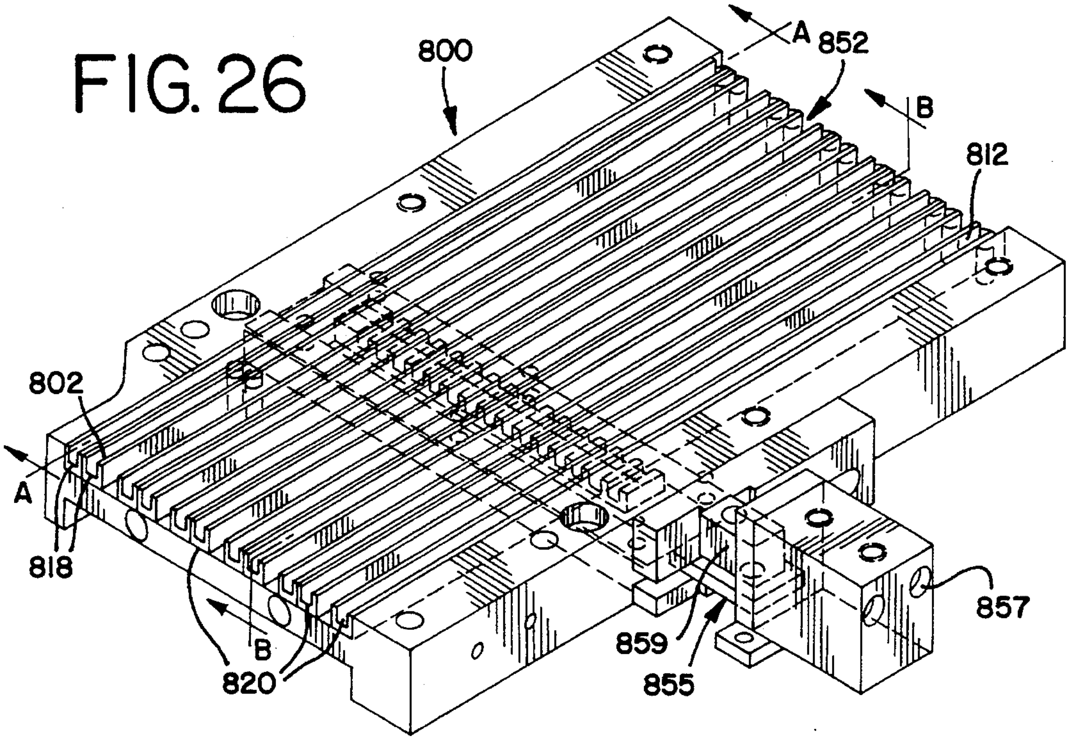
FIG. 26 is a perspective view of a wire shifting assembly used in the harness-making machine of FIG. 1.

The machine 100 also includes an assembly 700 for separating successive arrays 60 of second connector elements 15 from interconnected supply belts 36 of same and loading them into the second connector element transfer nest 612. FIG. 25 illustrates such a feed assembly 700 which is mounted generally behind and partially offset from the second termination station 600. (FIGS. 1 & 25.) The feed assembly 700 is virtually identical to the first connector element feed assembly 200 except that it separates a lead row of second connector elements 15 on the opposite side of the wire harness transfer feed path H compared to the first feed assembly 200.

The second feed assembly 700 includes a conveyor 702 for advancing the interconnected supply belts 36 along their axes $L_2$ from a supply station 704 to a separating and loading station 706. The loading station 706 includes a connector element receiving channel 708 which defines a second connector element feed path $P_2$ transverse thereto. The conveyor 702 moves the second connector elements 15 into the channel 708, whereupon a severing knife 710 is actuated and severs the integral bridging pieces 17 interconnecting the connector elements. The knife blade portion, like its first feed assembly counterpart 232, defines a substantially planar surface against which the separated row of second connector elements 15 abut. The severing knife 710 is mounted on a mounting block 712 and is driven in its reciprocating vertical movement along guide posts 714 by a suitable power cylinder 716. Once severed, the row of second connector elements is advanced out of its channel 708 and into the channel 613 of the second connector element transfer nest 612 (FIGS. 22 & 23) which lies adjacent to the second feed assembly loading station 706 and in communication therewith. The second connector elements are advanced out of the loading station channel 208 by a push rod 717 aligned therewith and operated by a power cylinder 718. Optical sensors 720 may be mounted in place upon the loading station 706 in order to determine the absence or presence of second connector elements in the channel 708.

Harness Wire Shifting Assembly

Figure 27:
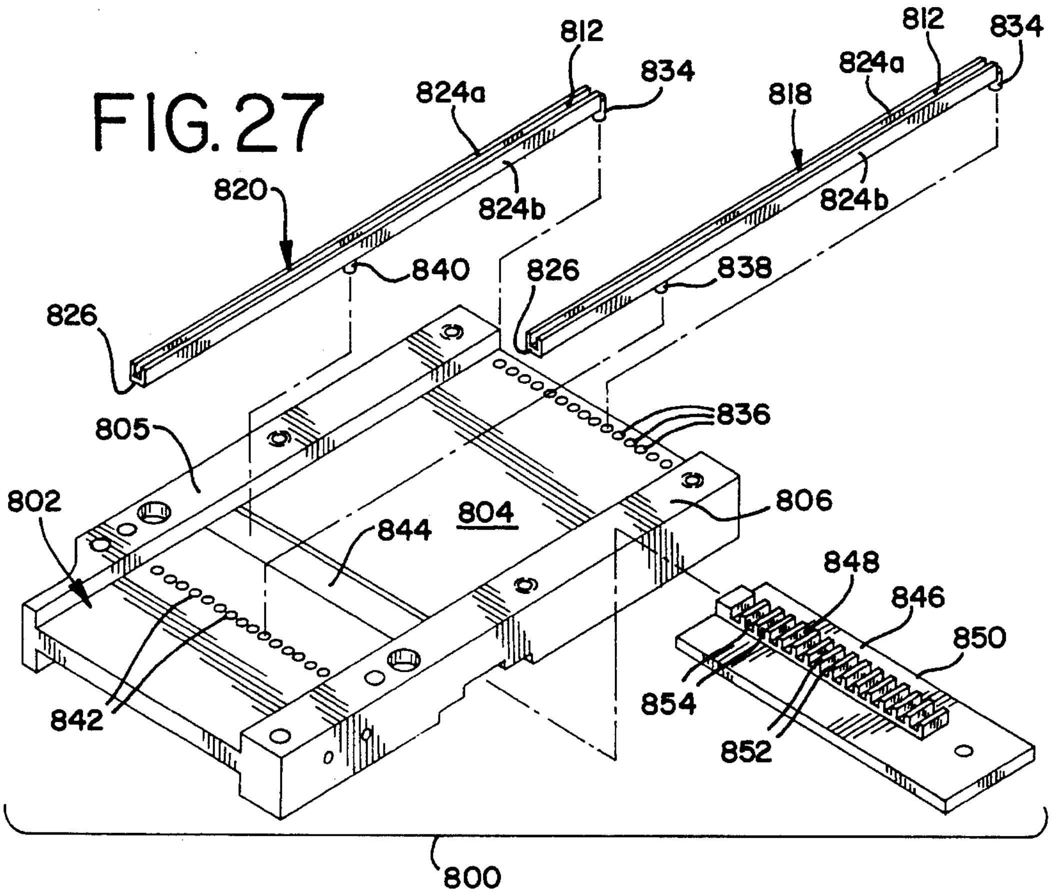
FIG. 27 is an exploded view of the wire shifting assembly of FIG. 26.
Figure 29B:
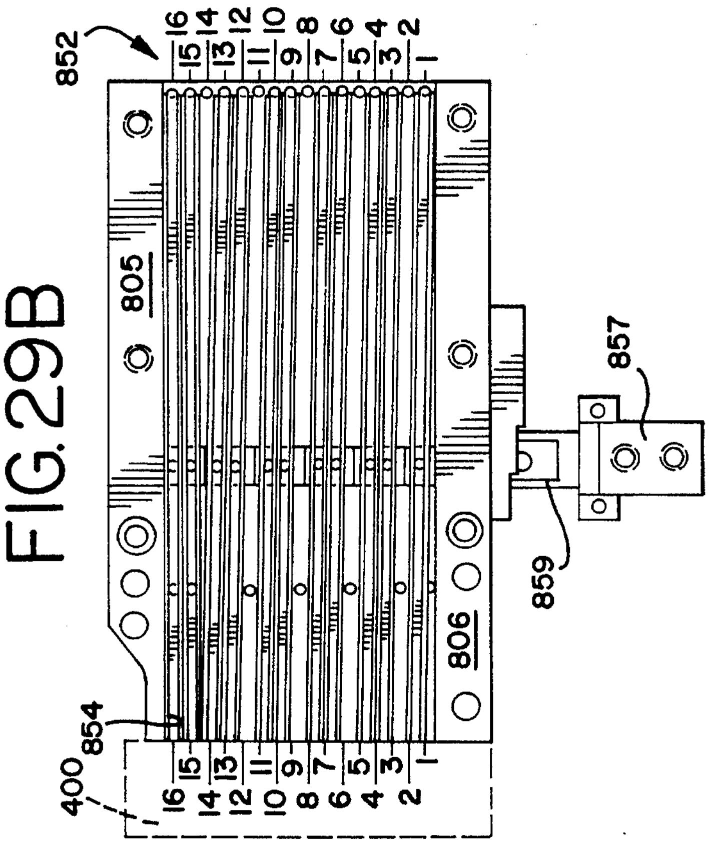
FIG. 29B is a plan view illustrating the wire shifting assembly of FIG. 26 in a shifted position wherein selected wire guides have been laterally shifted one position.

FIGS. 26–29 illustrates a wire shifting assembly, generally indicated at 800, which may be mounted to the frame of the machine 100 ahead of the first termination station 400 which may be used to shift positions of selected ones of the harness wires 12. The wire shifting assembly 800 includes a frame, or pedestal 802, having a generally planar wire guide support surface 804 defined thereon disposed between two sidewalls 805, 806. The frame 802 supports a plurality of wire guides 818, 820 thereon, and as best illustrated in FIG. 27, each wire guide 818, 820 includes an elongated channel 812 which receives a wire longitudinally therein during operation of the apparatus. The channel 812 is defined by two sidewalls 824*a*, 824*b* and a base portion 826. The wire guide base portions 826 rest on the frame guide support surface 804. The fixed wire guides 818 remain in position upon the support surface 804 while the moveable wire guides 820 move laterally thereon during the shifting.

The wire guides 818, 820 each engage the pedestal 802 along a common line proximate to the entrance of the assembly 800. Each wire guide 818, 820 is preferably provided with an engagement means such as a cylindrical post 834 which is received in a corresponding opening 836 formed in the wire guide support surface 804 (FIG. 27). These engagement posts 834 and their corresponding openings 836 define a point about which the moveable wire guides may pivot to laterally shift the wire guides 820 one position on the apparatus support surface 804.

Each of the wire guides 818, 820 further includes second engagement posts 838, 840. Posts 838 are associated with the fixed wire guides 818 while the posts 840 are associated with the moveable wire guides 820. These second posts 838, 840 are spaced apart from the wire guide first posts 836 and extend down from the wire guide base portions 836 in a manner comparable to that of the first engagement posts 834. The posts 834, 838 and 840 may be integrally formed in the guide members or separately formed and applied thereto through appropriately positioned openings in the base portions thereof (not shown). The second posts 838 of the fixed wire guide members 818 cooperate with corresponding openings 842 defined in the wire guide support surface 804, whereby the fixed wire guide member 818 remains firmly positioned in its preselected location on the apparatus frame 804. The engagement between the first and second posts 834 and 838 of the fixed wire guide members 818 prevent any movement of same upon the support surface 14.

Figure 28B:
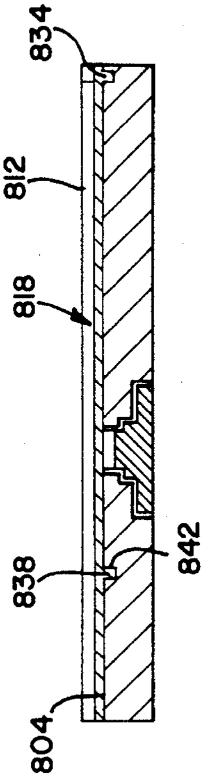
FIG. 28A is a sectional view of the wire shifting assembly of FIG. 26 taken generally along lines A—A; and, FIG. 28B is a sectional view of the wire shifting assembly of FIG. 26 taken generally along lines B—B.
Figure 28A:
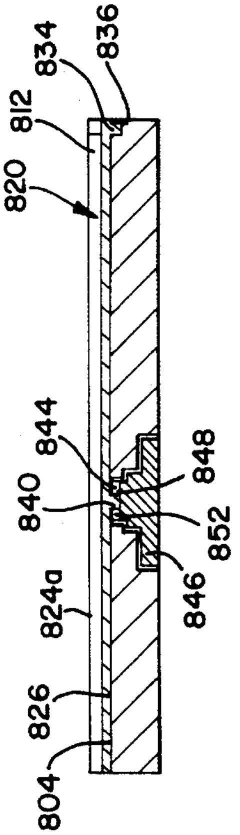
Figure 29A:
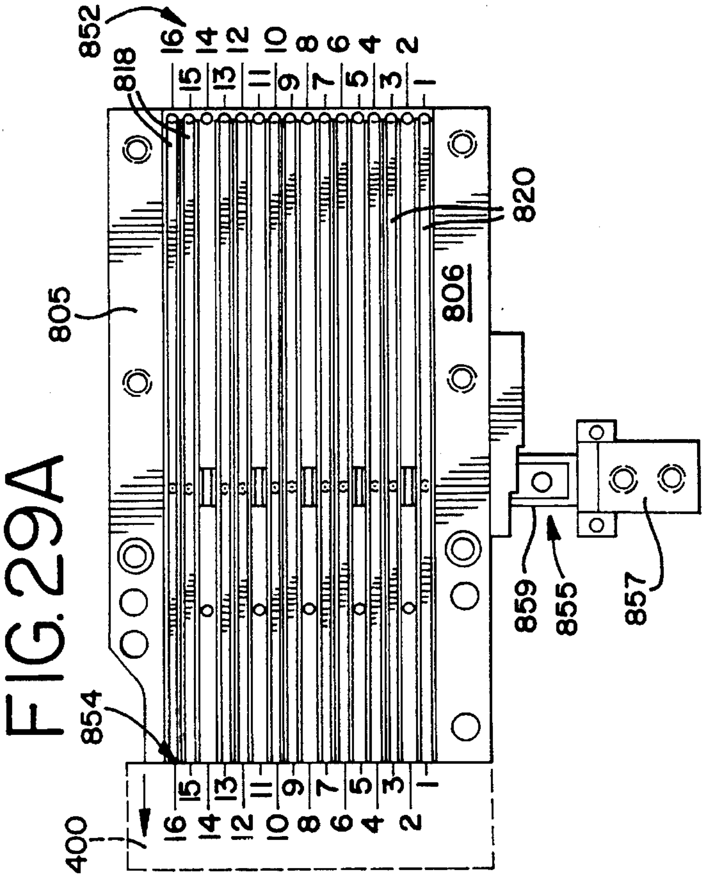
FIG. 29A is a plan view illustrating the wire shifting assembly of FIG. 26 in an unshifted position wherein all of the wire guides are parallel to each other.

In contrast to the fixed wire guide members 818, the second posts 840 of the moveable guide members 820 are not received within any fixed opening in the wire guide support surface 814, but rather are received within a transverse slot 844 which extends between the assembly sidewalls 805, 806. This slot 844 receives a means for engaging the moveable wire guide members 820 and actuating the lateral movement thereof during operation of the assembly 800. Importantly, the slot 844 receives an actuator, illustrated as an elongated rack 846, which extends therein between the opposing sidewalls 805, 806 of the frame 804. The rack 846 has a plurality of engagement openings illustrated as grooves 848, which are spaced-apart from each other along a frame engagement portion 850 thereof and which are separated by intervening lands 852. The lands 852 not only define the width of the grooves 848 but also define vertical engagement surfaces 854 formed by the sidewalls of the lands 852 which may abut the moveable wire guide member second posts 840 (FIG. 28A).

In order to actuate the shifting apparatus and operate the rack 846 in a reciprocating lateral movement within the frame slot 844, the apparatus preferably includes an actuating assembly 855 which actuates the shifting apparatus in response to a suitable actuation signal issued from a control means (not shown). This actuating assembly 855 may include a pneumatic cylinder 857 operatively connected to a piston rod or engagement head 859. The engagement head 859 in turn is operatively connected to the rack 846 near the end thereof to actuate the moveable wire guide members 820 in a shifting movement upon the apparatus support surface 814. Other suitable means may also be used to accomplish the shifting movement of the moveable wire guides upon demand such as a solenoid assembly, hydraulic cylinder, stepper motor or the like.

Figure 24:
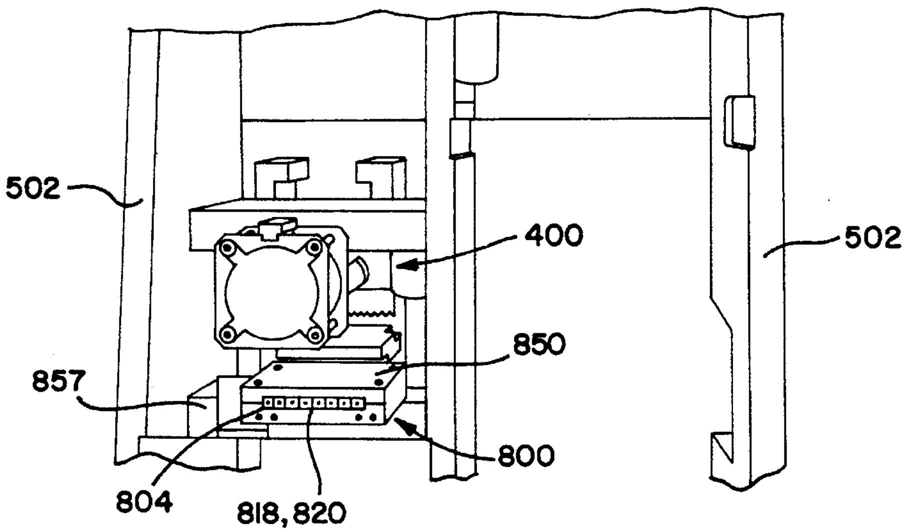
FIG. 24 is a perspective view of the rear of the first termination assembly with the second termination assembly removed from the machine frame.

The wire shifting assembly 800, preferably located in the wire feed path between the wire feed motors 70 and the first termination station 400 and, most preferably, is located behind and adjacent to the first termination assembly wire locator 430. (FIGS. 20, 21 & 24). The shifting assembly 800 may include a cover plate 850 to reduce the likelihood of any wires biasing out of the wire guide channels 812 during the wire feeding process. The entrance 852 of the wire shifting assembly occurs near where the wire guides 818, 820 engage the pedestal opening 836 with their engagement posts 834. This entrance 852 is disposed rearwardly from the first termination assembly 402 (FIG. 24) so that the shifting movement of the assembly 800 will shift the harness wires being fed therethrough at the termination station 400 so that the wire transfer assembly 500 will clamp the shifted wires in place between the respective opposing clamping plates 524, 525. The transfer assembly 500 will maintain the shifted wires in their shifted orientation as it moves into alignment with the second termination station 600 (FIG. 7F).

Operation

During termination of the first harness of a set of harnesses to be terminated, a series of harness wires 12 are advanced through the wire guide mechanism 800 and stationary wire guiding member 450 and cut to their proper lengths. The first transfer nest 304 is then brought into contact with the wire support 458 to force it and wire locator 456 against the clamping members 452, 454. Cylinder 460 is actuated to force pin 462 upward in order to retain wire locator 456 and wire support 458 in their retracted positions. The upper wire cutting blade is positioned as shown in FIG. 21 and press ram 402 is actuated to urge wires 12 into contact with the terminals of the first array 14 of connector elements to form a partial wire harness assembly.

The terminated first connector element array 14 is then returned back to the first connector element supply track 55 when the first transfer nest 304 reciprocates back along its guide rail 302. Wires 12 are then fed to a predetermined length to define the final length of the wire harnesses. In addition, transfer assembly 500 is moved from a positioned aligned with the second work station 600 to a position aligned with first work station 400. As such, the wires 12 pass through the intervening passage defined between the two opposing clamping members 518, 519 of clamping mechanism 516 when they are in their initial, spaced apart, non-clamping position. The wires also pass through wire shifting mechanism 800 and wire guiding mechanism 450.

After the wires have been fed to the desired lengths, the pneumatic cylinders 522 of each of the clamping members are actuated to clamp the wires in place. The upper wire cutting blade 404 is then moved horizontally to its position directly above lower blade 406. The pneumatic cylinders 550, 552 connected to wire locator 530 and wire support 531 are actuated in order to retract the locator and support from the cutting plane along which the upper and lower cutting blades will move. The first press ram 402 and pneumatic cylinder 421 are then actuated to cause the cutting blades to move towards each other to cut the wires to define a second series of free, or loose, wire ends which will eventually engage the array of second connector elements 15 and a new first series of free wire ends that will subsequently be terminated to a new array of first connector elements 14 which will start a new harness. As such, the second free ends are retained between wire clamping members 518, 519 of transfer assembly 500 while the new first free ends are maintained in position by servo motors 70, wire locator 530 and wire support 531.

The transfer assembly 500, with the second wire ends gripped therein, is then shifted from it alignment with the first work station 400 to alignment with the second work station 600. This shifting movement occurs simultaneously with the previously terminated array of first connector elements 14 being laterally transferred along first connector transfer track 55 by transfer beam 480. Pneumatic cylinders 550, 552 operatively connected to wire locator 530 and wire support 532 are then extended to permit the wire locators and supports to return to their extended positions. Pneumatic cylinder 460 is retracted to permit wire locator 456 and wire support 458 to spring back to their extended positions. At such extended positions, the tips of the wires will extend to the edges of the wire locators and wire supports to ensure the proper location of the wire tips.

The first transfer nest 304, having a new array of first connector elements therein, is then moved towards the first work station 400 until the transfer nest 304 contacts wire support bar 458 and laterally moves wire locator 456 and support bar 458 to their retracted positions at which point the first free ends of the wires have entered wire receiving apertures in the connector elements. As set forth above, cylinder 460 is actuated to retain the locator 530 and support 531 in their proper position for the next cutting cycle. Substantially simultaneously, an array of second connector elements 15 is moved into position within a second connector element supply track 76 and thereupon advanced into a second transfer nest 612, which is moved toward the clamping mechanism 516 of the transfer assembly 500. The second transfer nest 612 contacts the wire support bar 531 and laterally moves the support bar and locator bar 530 to expose the second free ends of the wires and permit them to enter wire receiving apertures in the second array of connector elements. The slots 532 of the wire locator bars 456, 530 maintain the wires in their prearranged order and spacing throughout transfer of the harness wires 12 and termination of the free ends of the wires. Both press rams 402 and 636 are then substantially simultaneously activated to force the connector halves together in order to terminate the connector elements to the wires. The process set forth above beginning with the return of the terminated first connector elements 14 and first transfer nest 304 to transfer track 55 begins again and continues until the desired number of harnesses have been terminated.

It will be appreciated that the embodiments of the present invention which have been discussed are merely illustrative of some of the applications of this invention and that numerous modifications may be made by those skilled in the art without departing from the true spirit and scope of this invention.

We claim:

1. An apparatus for assembling wire harnesses in which each assembled wire harness has a plurality of elongated wires with first and second ends interconnected to first and second of electrical connector elements, the apparatus comprising:

means for feeding multiple wires along a wire feed path from a wire source to a work station;

the work station including a first termination station aligned with the wire feed means, the first termination station having first means for terminating said first ends of the wires fed from said wire source into engagement with a first electrical connector element;

means for moving said first electrical connector element in a downstream direction away from said first work station along said wire feed path;

a second work station spaced apart from said first work station along a line generally perpendicular to said wire feed path, the second work station including a second termination station having second means for terminating said second ends of said wires to a second electrical connector element; and, means for transferring said wire second ends from said first termination station to said second termination station along a wire harness feed path generally transverse to said wire feed path, whereby said first and second terminating means may be operated together to substantially simultaneously terminate, at said first termination station, a first electrical connector element to first ends of a plurality of wires and, at said second termination station, a second electrical connector element to second ends of a second plurality of wires, said second plurality of wires preceding said first plurality of wires through said work station.

2. The wire harness assembly apparatus as defined in claim 1, further including first and second connector element advancement tracks disposed generally perpendicular to said wire feed path.

3. The wire harness assembly apparatus as defined in claim 2, further including first electrical connector transfer means for moving said first electrical connector between said first connector element advancement track and said first work station.

4. The wire harness assembly apparatus as defined in claim 1, wherein said wire feed means feeds said wires to said first work station in a preselected orientation and said apparatus includes means for shifting selected wires of said plurality of wires out of said preselected orientation after termination of first ends of a plurality of wires to a first electrical connector element and prior to termination of said second ends of said plurality of wires to a second electrical connector.

5. The wire harness assembly apparatus as defined in claim 1, further including first means for successively supplying said first electrical connector elements to said first work station and second means for successively supplying said second electrical connector elements to said second work station, said first and second electrical connector element supply means being disposed on opposite sides of said wire harness feed path.

6. The wire harness assembly apparatus as defined in claim 5, wherein each of said first and second connector element supply means includes a connector element supply conveyor which intersects with respective first and second connector element advancement tracks, said advancement tracks having an interruption at said intersection, said first and second connector element supply having first and second severing means operatively associated therewith, said first and second severing means closing off said respective first and second interruptions of said first and second advancement tracks during severing of said first and second connector elements from first and second connector elements supplies.

7. The wire harness assembly apparatus as defined in claim 3, wherein said first electrical connector element supply means includes a transfer nest reciprocatable between said first work station and a first connector element advancement track, the first connector element transfer track being generally perpendicular to said wire feed path and said transfer nest moving in a path generally parallel to said wire feed path, said first electrical connector elèment transfer nest including a portion of said first electrical connector element transfer track.

8. The wire harness assembly apparatus as defined in claim 3, further including second electrical connector supply means for moving said second electrical connector element between a second electrical connector element supply assembly and said second work station, said first and second electrical connector element supply means moving along parallel paths which are generally perpendicular to said wire harness transfer path.

9. The wire harness assembly apparatus as defined in claim 1, wherein said first electrical connector element moving means includes a reciprocatable first connector element nest assembly, the first connector element nest assembly including an elongated channel portion which receives at least one first electrical connector element therein, the channel portion having means for selectively engaging a surface of said first electrical connector element and retaining said first electrical connector in place within said channel during movement of said first electrical connector assembly.

10. The wire harness assembly apparatus as defined in claim 9, wherein said first connector element selective engagement means includes an elongated pilot bar disposed proximate to said channel portion, the pilot bar having a plurality of vertical engagement tabs which selectively extend upwardly through a surface of said channel portion to engage said first connector element.

11. The wire harness assembly apparatus as defined in claim 9, wherein said channel portion selectively forms a portion of a first connector element advancement track, said first connector element selective engagement means disengaging said first electrical connector element when said channel portion is in place within said first connector element advancement track, whereby said first connector element may be advanced along said first advancement track.

12. The wire harness assembly apparatus of claim 1, wherein said wire second end transfer means includes means for clamping said wire second ends, means for moving said clamping means to said second work station, collapsible wire end protection means extending from said clamping means for protecting the order in which said wire second ends are clamped.

13. The wire harness assembly apparatus as defined in claim 12, further including means for moving said second electrical connector element from a second electrical connector supply to said second termination station and into contact with said wire second end transfer means collapsible wire end protection means to thereby collapse said protection means and expose said second wire ends for termination to a second connector element.

14. The wire harness assembly apparatus as defined in claim 12, wherein said collapsible wire end protection means includes a wire locator and a wire support extending from said clamping means for a predetermined length to define a moveable protective enclosure for said wire second ends, the wire support being collapsible upon said clamping means when external pressure is exerted upon said wire locator.

15. A method of assembling wire harnesses by successively terminating electrical of connectors to opposite ends of sets of elongated wires, comprising the steps of:

a) providing first and second parallel connector advancement tracks;

b) providing first and second wire-connector termination stations along a wire harness feed path which is generally parallel to said connector advancement tracks;

c) feeding a plurality of wires along a wire feed path to said first wire-connector termination station;

d) conveying said first connector to said first wire-connector termination station along a first connector transfer path which is transverse to wire harness feed path;

e) inserting a first set of free ends of said wires into said first connector;

f) engaging said first connector with a first termination press to terminate said first set of free wire ends to said first connector;

g) conveying said terminated first connector to said first connector advancement track;

h) feeding a predetermined length of said wires past said first wire-connector termination station from a wire supply source;

i) guiding a first portion of said wires at said first wire-connector termination station;

j) clamping a second portion of said wires at a wire transfer mechanism, said first and second portions being adjacent each other and said second portion being downstream from said first portion;

k) cutting said wires between said first and second portions to define a second set of free ends of said wires clamped within said wire transfer mechanism and a subsequent first set of free ends of a subsequent plurality of wires maintained at said first wire-connector termination station;

l) simultaneously transferring along said wire feed path said second set of free ends of said wires to said second wire-connector termination station while advancing said first connector along said first connector advancement track a predetermined distance;

m) conveying a second connector to said second wire-connector termination station along a second connector transfer path which is transverse to said wire harness feed path;

n) conveying a subsequent first connector to said first wire-connector termination station along said first connector transfer path;

o) simultaneously terminating said subsequent first connector to said subsequent first set of free ends of said subsequent plurality of wires maintained at said first wire-connector termination station and said second connector to said second set of free ends of said plurality of wires clamped at said second wire-connector termination station to complete a first wire harness and to partially terminate a subsequent wire harness; and p) repeating steps g-o until a desired predetermined number of wire harnesses have been terminated.

16. The method as claimed in claim 15, further comprising separating successive first and second connectors from multiple connector supplies by driving a severing knife through bridging portions which interconnect adjoining connectors of said multiple connector supplies, said severing knife having an elongated planar surface which forms a portion of a guide surface of each of said first and second connector advancement tracks.

17. The method as claimed in claim 15, further including the step of generating an alarm signal in response to the absence of at least one connector in either of said first or second arrays of connectors prior to termination of said connectors.

18. The method as claimed in claim 15, further including the step of releasably holding said first and second arrays of connectors in respective first and second connector transfer nests during transfer movement of said first and second connector transfer nests from first and second connector array supply stations to said first and second wire-connector termination stations.

19. The method as claimed in claim 15, further including the steps of feeding said wires through a wire guide assembly prior to inserting said first set of free ends into said first connector, the wire guide assembly having at least one elongated wire guide channel, and moving said wire guide channel laterally in order to shift the position of at least one of said wires with respect to remaining ones of said wires.

* * * * *